US012298679B2

(12) United States Patent
Tanimoto

(10) Patent No.: US 12,298,679 B2
(45) Date of Patent: May 13, 2025

(54) PRINT HEAD

(71) Applicant: Toshiba Tec Kabushiki Kaisha, Tokyo (JP)

(72) Inventor: Koji Tanimoto, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/453,072

(22) Filed: Aug. 21, 2023

(65) Prior Publication Data

US 2025/0068093 A1 Feb. 27, 2025

(51) Int. Cl.
*G03G 15/04* (2006.01)
*G03B 27/54* (2006.01)

(52) U.S. Cl.
CPC ..... *G03G 15/04036* (2013.01); *G03B 27/542* (2013.01)

(58) Field of Classification Search
CPC ....... G03G 15/04036; G03G 15/04054; G03B 27/542; B41J 2/451
See application file for complete search history.

(56) References Cited

U.S. PATENT DOCUMENTS

| | | | |
|---|---|---|---|
| 2007/0236554 A1 | 10/2007 | Koike | |
| 2009/0009875 A1* | 1/2009 | Nomura | B41J 2/451 |
| | | | 359/621 |
| 2010/0073780 A1* | 3/2010 | Ito | B41J 2/451 |
| | | | 359/793 |
| 2018/0275319 A1 | 9/2018 | Tagawa et al. | |
| 2019/0377279 A1* | 12/2019 | Yoshida | G03G 15/04054 |
| 2021/0080853 A1* | 3/2021 | Tanimoto | B41J 2/451 |
| 2021/0318636 A1* | 10/2021 | Iwai | G03G 15/04054 |

FOREIGN PATENT DOCUMENTS

| | | |
|---|---|---|
| JP | 2008-256933 A | 10/2008 |
| JP | 2017-074730 A | 4/2017 |

* cited by examiner

*Primary Examiner* — Sophia S Chen
(74) *Attorney, Agent, or Firm* — FOLEY & LARDNER LLP

(57) ABSTRACT

A print head includes a transparent substrate on which a light emitting element is formed, a lens configured to condense light from the light emitting element that passes through the transparent substrate, and a holder including a first supporting surface that supports the transparent substrate and a second supporting surface that supports the lens. The holder is formed from a single, continuous piece of material by bending.

17 Claims, 23 Drawing Sheets

PRINT HEAD

FIELD

Embodiments described herein relate generally to a print head mounted on an image forming apparatus placed in a workplace.

BACKGROUND

Supports having complicated shapes and a large number of members have been used in a print head in order to keep constant a positional relation between a substrate on which a plurality of light emitting elements are formed and a lens array.

However, the supports having the complicated shapes and the large number of members cause a cost increase and a combination of the large number of members causes deterioration in optical accuracy.

DETAILED DESCRIPTION

Figure 1:
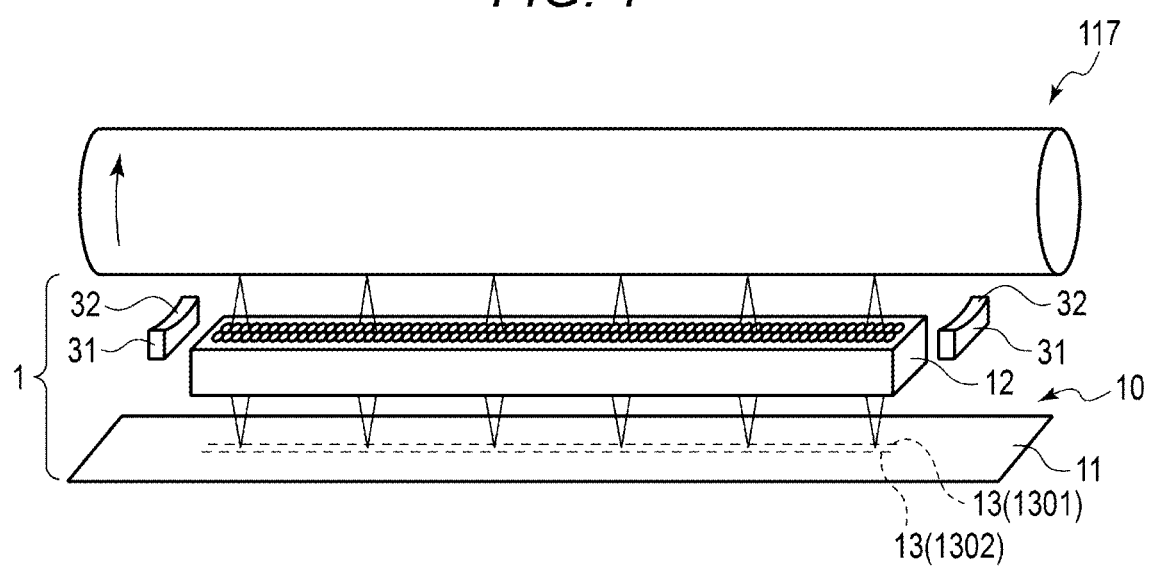
FIG. 1 is a perspective view illustrating an example of a basic configuration of a print head according to an embodiment.

A print head according to an embodiment includes: a transparent substrate on which a light emitting element is formed; a lens configured to condense light from the light emitting element that passes through the transparent substrate; and a holder including a first supporting surface that supports the transparent substrate and a second supporting surface that supports the lens. The holder is formed from a single, continuous piece of material by bending.

The embodiment is explained below with reference to the drawings. In the figures, the same components are denoted by the same reference numerals and signs. In the embodiment, first, the print head is explained. Subsequently, an image forming apparatus mounted with the print head is explained. The image forming apparatus includes a printer, a copying machine, and a multi-functional peripheral (MFP).

(Basic Configuration of the Print Head)

An example of a basic configuration of the print head according to the embodiment is explained with reference to FIGS. 1 to 5. In the drawings used for the explanation of the embodiment, scales of sections are sometimes changed as appropriate. In the drawings used for the explanation of the embodiment, a part of components is sometimes omitted for the explanation.

FIG. 1 is a perspective view illustrating an example of a basic configuration of a print head 1 according to the embodiment. In FIG. 1, a photoconductive drum of the image forming apparatus mounted with the print head 1 is also drawn. That is, FIG. 1 illustrates an example of a positional relation between the print head 1 and the photoconductive drum.

As illustrated in FIG. 1, the image forming apparatus includes the print head 1 and a photoconductive drum 117 illustrated in FIG. 1. The print head 1 is disposed to be opposed to the photoconductive drum 117.

The photoconductive drum 117 rotates in a direction of an arrow illustrated in FIG. 1. The rotating direction of the photoconductive drum 117 is referred to as sub-scanning direction (Y-axis direction). A direction orthogonal to the sub-scanning direction is referred to as main scanning direction (X-axis direction). The photoconductive drum 117 is uniformly charged by a charger and exposed by light emitted from the print head 1. The potential of an exposed portion of the photoconductive drum 117 drops. That is, the image forming apparatus controls the light emission of the print head 1 and forms an electrostatic latent image on the photoconductive drum 117. The controlling the light emission of the print head 1 means controlling timings of the light emission and extinction (i.e., non-light emission) of the print head 1.

The print head 1 includes a light emitting section 10 and a rod lens array 12. The light emitting section 10 includes a transparent substrate 11. For example, the transparent substrate 11 is a glass substrate that transmits light. The transparent substrate 11 is formed with a high surface accuracy. A light emitting element row 13 is formed on the transparent substrate 11. The light emitting element row 13 includes a plurality of light emitting elements. The light emitting element row 13 is disposed in parallel to a rotation axis of the photoconductive drum 117. For example, the light emitting elements are organic EL (OLEDs). For example, the organic EL is collectively formed on the transparent substrate 11 by a lithography technology using a mask. Therefore, the organic EL is formed on the transparent substrate 11 at high position accuracy.

The print head 1 may include a plurality of light emitting element rows or may include a single light emitting element row. For example, as illustrated in FIG. 1, the print head 1 includes two parallel light emitting element rows, that is, a first light emitting element row 1301 and a second light emitting element row 1302.

The rod lens array 12 is disposed between the light emitting section 10 and the photoconductive drum 117. The rod lens array 12 is disposed in parallel to the rotation axis of the photoconductive drum 117. The rod lens array 12 condenses, on the photoconductive drum 117, lights emitted from light emitting elements 131 in the two rows of the first light emitting element row 1301 and the second light emitting element row 1302. Consequently, an image line corresponding to the light emission of the light emitting elements 131 is formed on the photoconductive drum 117.

The print head 1 includes a pair of gap spacers 31. The pair of gap spacers 31 is configured by the same structure. That is, the pair of gap spacers 31 has the same shape. The gap spacer 31 has a concave curved surface, for example, a cylindrical surface 32 facing the photoconductive drum 117. The cylindrical surface 32 of the gap spacer 31 has a curvature radius equivalent to the curvature radius of the photoconductive drum 117. The gap spacer 31 is made of resin and is machined at high accuracy. The pair of gap spacers 31 is disposed between the photoconductive drum 117 and a holder 40 (explained below: not illustrated in FIG. 1) and is disposed on both the sides of the rod lens array 12 in the longitudinal direction of the holder 40. The gap spacer 31 keeps the distance between the transparent substrate 11 and the photoconductive drum 117 at a predetermined fixed distance.

An example of the print head 1 including the light emitting element rows disposed in the two rows is explained above with reference to FIG. 1. However, the print head 1 may include a light emitting element row disposed in one row. In that case, the rod lens array 12 also corresponds to the light emitting element row disposed in the one row and condenses, on the photoconductive drum 117, lights emitted from light emitting elements disposed in the one row.

Figure 2:
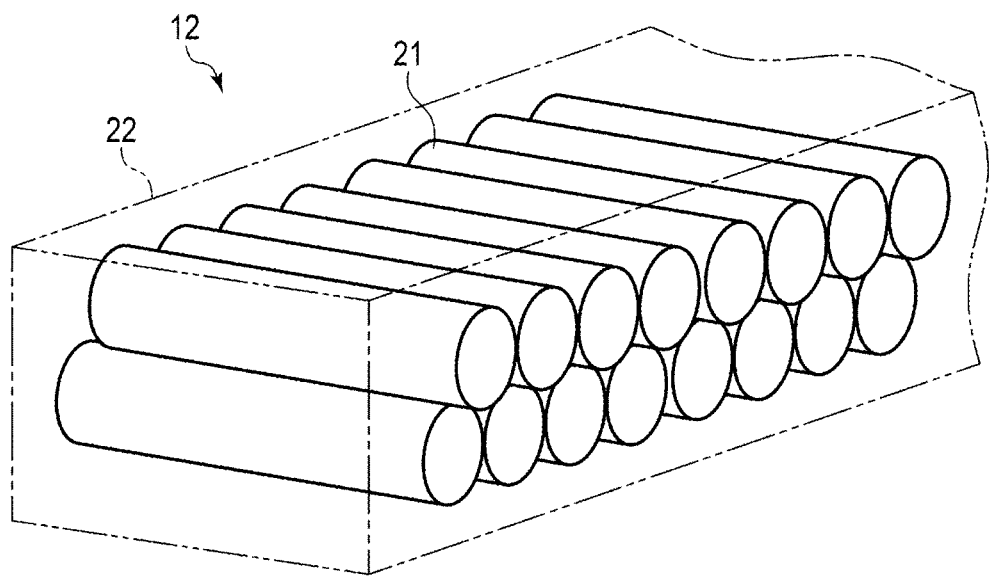
FIG. 2 is a perspective view illustrating an example of a rod lens array of the print head.

FIG. 2 is a perspective view illustrating an example of the rod lens array of the print head 1 according to the embodiment. A configuration of the rod lens array is not limited to a configuration illustrated in FIG. 2 and may be another configuration.

As illustrated in FIG. 2, the rod lens array 12 includes a plurality of rod lenses 21. The rod lenses 21 are stacked in a heaped bale shape in two stages. The plurality of rod lenses 21 stacked in a heaped bale shape are solidified in a rectangular parallelepiped shape by resin 22. That is, the rod lens array 12 has a rectangular parallelepiped exterior shape.

Figure 3:
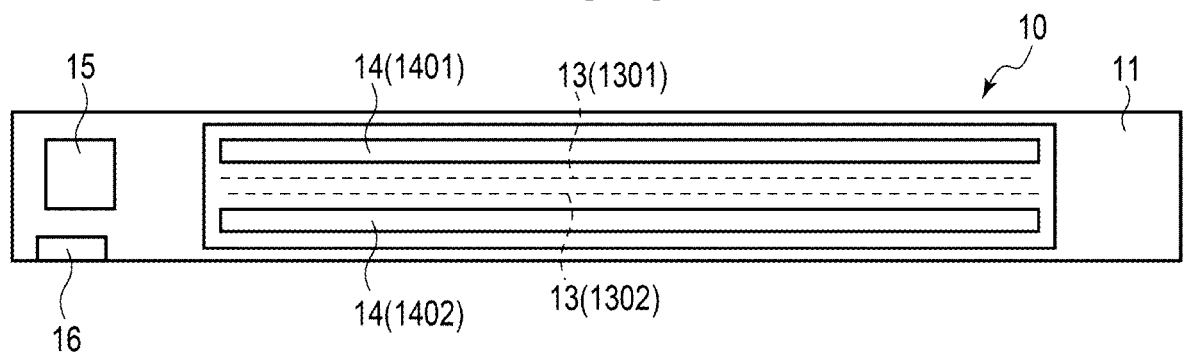
FIG. 3 is a diagram illustrating an example of a transparent substrate of the print head.

FIG. 3 is a diagram illustrating an example of the transparent substrate 11 of the print head 1 according to the embodiment. FIG. 3 illustrates an example of the transparent substrate corresponding to the light-emitting element rows disposed in the two rows. However, the print head may be light emitting elements disposed in one row.

As illustrated in FIG. 3, the two light emitting element rows 13 (the first light emitting element row 1301 and the second light emitting element row 1302) are formed in the center on the transparent substrate 11 in the longitudinal direction of the transparent substrate 11. Driving circuit rows 14 (a first driving circuit row 1401 and a second driving circuit row 1402) for driving the light emitting elements (causing the light emitting elements to emit light) are formed near the light emitting element rows 13. In FIG. 3, the driving circuit rows 14 for driving the light emitting elements (causing the light emitting elements to emit light) are disposed on both sides of the two light emitting element rows 13. However, the driving circuit rows 14 may be arrayed on one side.

A control integrated circuit (IC) 15 is disposed at an end portion of the transparent substrate 11. The transparent substrate 11 includes a connector 16. The connector 16 is electrically connected to the print head 1 and a control system of a printer, a copying machine, a multi-functional peripheral, or the like. The connection enables power supply, head control, image data transfer, and the like. A substrate for sealing the light emitting element rows 13, the driving circuit rows 14, and the like not to touch the outside air is attached to the transparent substrate 11. If it is difficult to attach a connector to the transparent substrate, a flexible printed circuit (FPC) may be connected to the transparent substrate and electrically connected to the control system.

Figure 4:
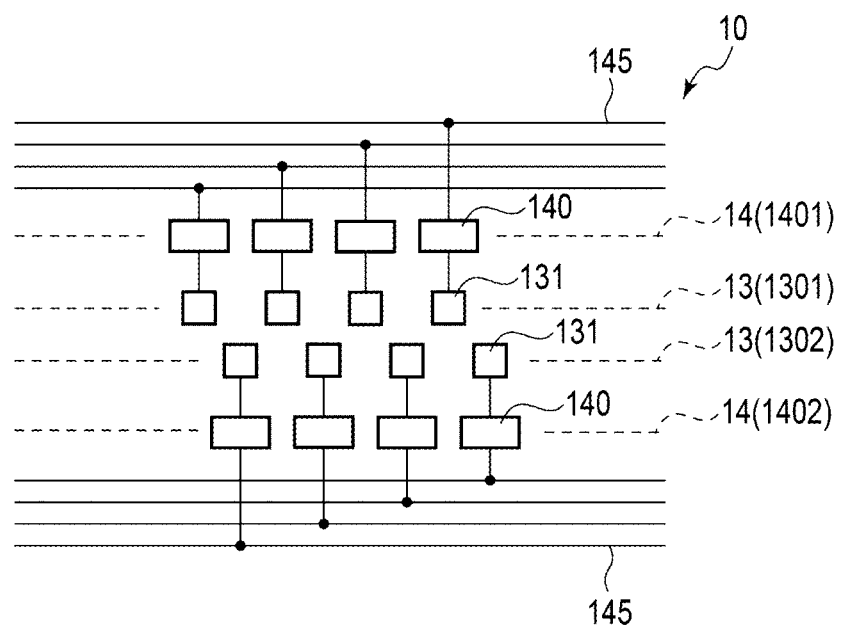
FIG. 4 is a plan view illustrating an example of a layout of light emitting elements and driving circuits of the print head.

FIG. 4 is a plan view illustrating an example of a layout of the light emitting elements 131 and driving circuits 140 of the print head 1 according to the embodiment. FIG. 4 illustrates an example of a layout of the driving circuits corresponding to the light emitting element rows disposed in the two rows. However, the print head may include light emitting elements disposed in one row.

As illustrated in FIG. 4, the light emitting section 10 of the print head 1 includes the light emitting element rows 13 in which pluralities of light emitting elements 131 are arranged and the driving circuit rows 14 in which pluralities of driving circuits 140 are arranged. The driving circuits 140 cause, based on signals of wires 145, the light emitting elements 131 respectively connected to the driving circuits 140 to emit light.

Figure 5:
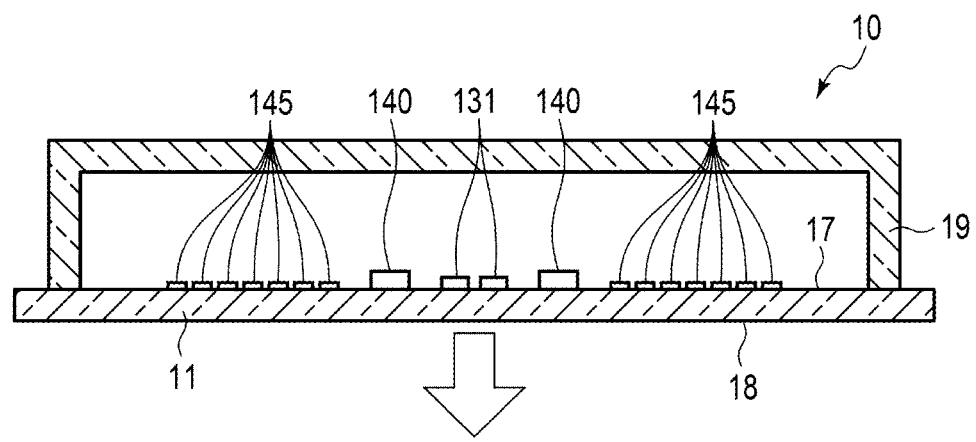
FIG. 5 is a diagram illustrating an example of a cross section of the transparent substrate.

FIG. 5 is a diagram illustrating an example of a cross section of the transparent substrate 11 of the print head 1 according to the embodiment. FIG. 5 illustrates an example of a cross section of the transparent substrate corresponding to the light emitting rows disposed in the two rows. However, the print head may include light emitting elements disposed in one row.

As illustrated in FIG. 5, the light emitting section 10 of the print head 1 includes a plurality of light emitting elements 131, a plurality of driving circuits 140, and a plurality of wires 145. The transparent substrate 11 includes a formation surface 17 on which the light emitting elements 131, the driving circuits 140, and the wires 145 are formed and a reference surface 18 located on the opposite side of the formation surface 17. The reference surface 18 is a surface serving as a reference of a focus position of lights from the light emitting elements 131 condensed on the photoconductive drum 117 by the rod lens array 12. The light emitting section 10 includes a sealing glass 19 fixed to the formation surface 17 of the transparent substrate 11. The sealing glass 19 has an elongated box shape opened in one surface and extends in the longitudinal direction of the transparent substrate 11. The sealing glass 19 seals the light emitting elements 131, the driving circuits 140, and the wires 145 in cooperation with the transparent substrate 11 not to touch the outside air. The lights emitted from the light emitting elements 131 are transmitted through the transparent substrate 11 and irradiated toward the photoconductive drum 117.

(Print Head According to a First Embodiment)

Subsequently, a print head according to a first embodiment is explained with reference to FIGS. 6 to 16.

Figure 6:
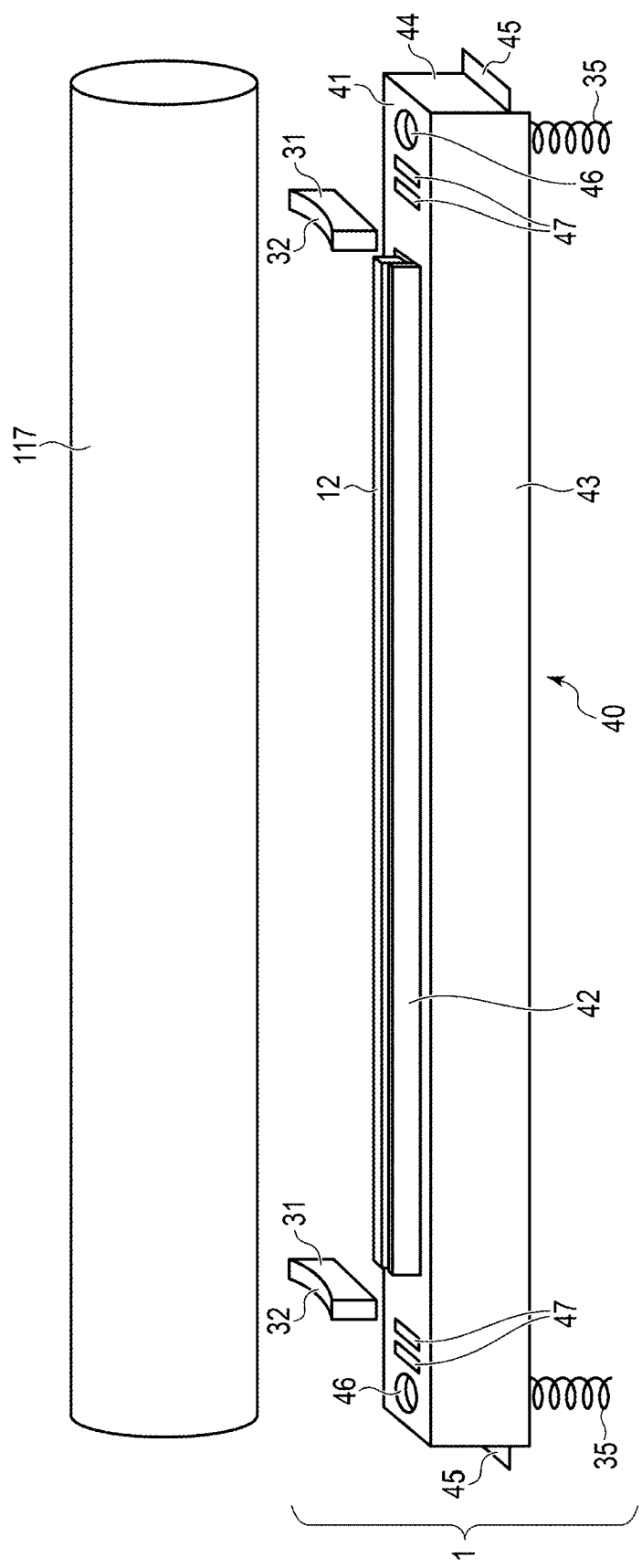
FIG. 6 is a perspective view illustrating an example of a print head according to a first embodiment.
Figure 7:
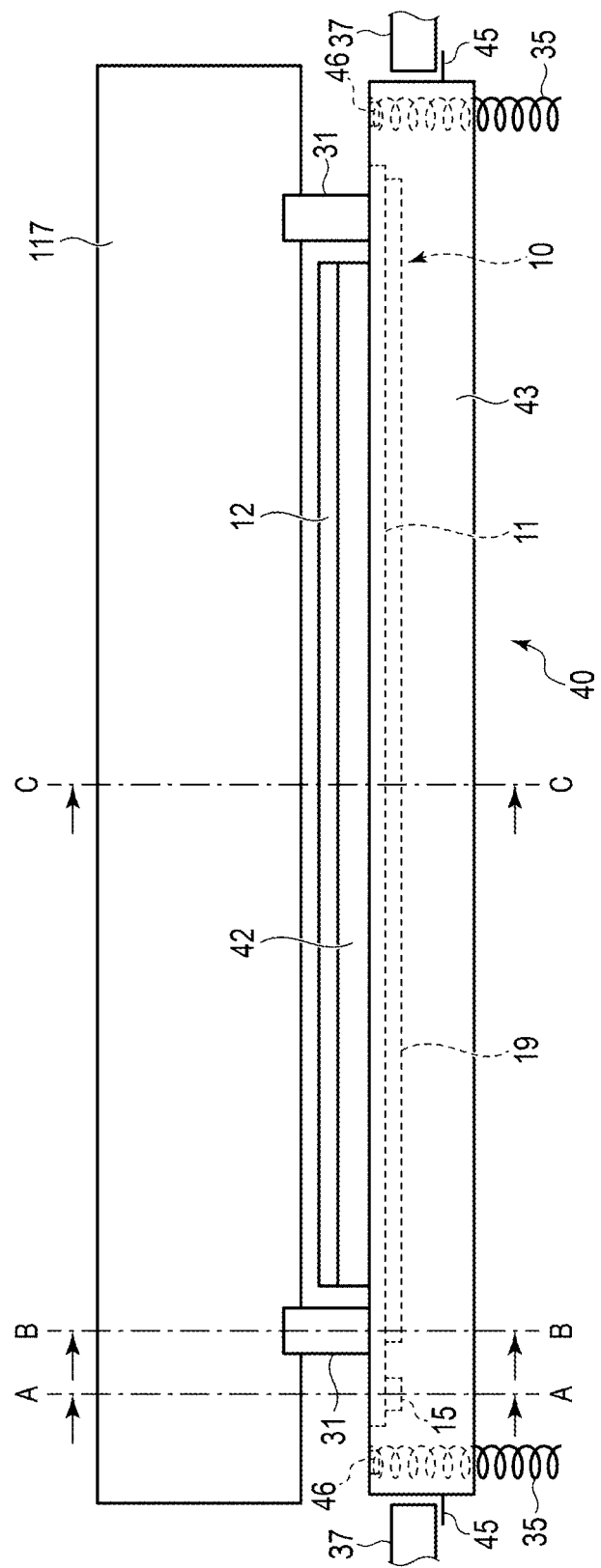
FIG. 7 is a side view illustrating an example of the print head.

FIG. 6 is a perspective view illustrating an example of the print head 1 according to the first embodiment. FIG. 7 is a side view illustrating an example of the print head 1 according to the first embodiment. In FIGS. 6 and 7, the photoconductive drum 117 of the image forming apparatus mounted with the print head 1 is also drawn.

The print head 1 includes the light emitting section 10, the rod lens array 12, and the holder 40 that holds the light emitting section 10 and the rod lens array 12. The configurations and the like of the light emitting section 10 and the rod lens array 12 are as explained above about the basic configuration of the print head.

The holder 40 has a rectangular parallelepiped box shape opened in the lower surface. That is, the holder 40 includes a rectangular ceiling section 41, top section, or body facing the photoconductive drum 117, a pair of sidewall sections 43 or flanges extending along a pair of long sides of the ceiling section 41, and a pair of end wall sections 44 extending along a pair of short sides of the ceiling section 41. The sidewall sections 43 extend downward perpendicularly to the ceiling section 41 from the pair of long sides of the ceiling section 41. The end wall sections 44 extend downward perpendicularly to the ceiling section 41 from the pair of short sides of the ceiling section 41. The pair of sidewall sections 43 and the pair of end wall sections 44 form a rectangular frame. The holder 40 includes, in lower parts of the pair of end wall sections 44, stoppers 45 extending to the outer side perpendicularly to the end wall sections 44.

The holder 40 includes a rectangular opening extending in the longitudinal direction at the ceiling section 41 and includes a supporting section 42 or flange extending along one long side of the opening and extending upward perpendicularly to the ceiling section 41. The rod lens array 12 is set in contact with the inner side surface of the supporting section 42 and positioned and is fixed to the supporting section 42 by an adhesive.

As explained above, the print head 1 includes the pair of gap spacers 31. The pair of gap spacers 31 is disposed between the photoconductive drum 117 and the holder 40 and on both the sides of the rod lens array 12 in the longitudinal direction of the holder 40.

The print head 1 includes a pair of urging members 35 (e.g., biasing elements, biasers, springs, etc.). The urging members 35 are disposed on the inner side of both end portions of the holder 40 and urge the holder 40 toward the photoconductive drum 117. For example, the urging members 35 are coil springs. However, the urging members 35 are not limited to the coil springs and may be other members, for example, elastic bodies such as leaf springs, rubber blocks, or sponges. The number of urging members 35 is not limited to be the same as the number of gap spacers 31. A plurality of urging members 35 may be provided for one gap spacer 31.

The gap spacers 31 are disposed between the holder 40 and the photoconductive drum 117. The urging members 35 urge the holder 40 toward the photoconductive drum 117, whereby cylindrical surfaces 32 of the gap spacers 31 come into contact with the photoconductive drum 117. Consequently, the gap spacers 31 keep the interval between the holder 40 and the photoconductive drum 117 at a predetermined fixed distance.

As illustrated in FIG. 7, stopper receivers 37 are provided above the stoppers 45. The stopper receivers 37 are configured by, for example, a part of a housing of the image forming apparatus mounted with the print head 1 according to this embodiment. For example, if the photoconductive drum 117 is replaced, the holder 40 is pushed up by the urging members 35 when the photoconductive drum 117 is detached. However, since the stoppers 45 hit the stopper receivers 37, upward movement of the holder 40 is restricted. That is, if the photoconductive drum 117 is absent, the holder 40 is prevented from jumping upward by the stoppers 45 and the stopper receivers 37.

Figure 8:
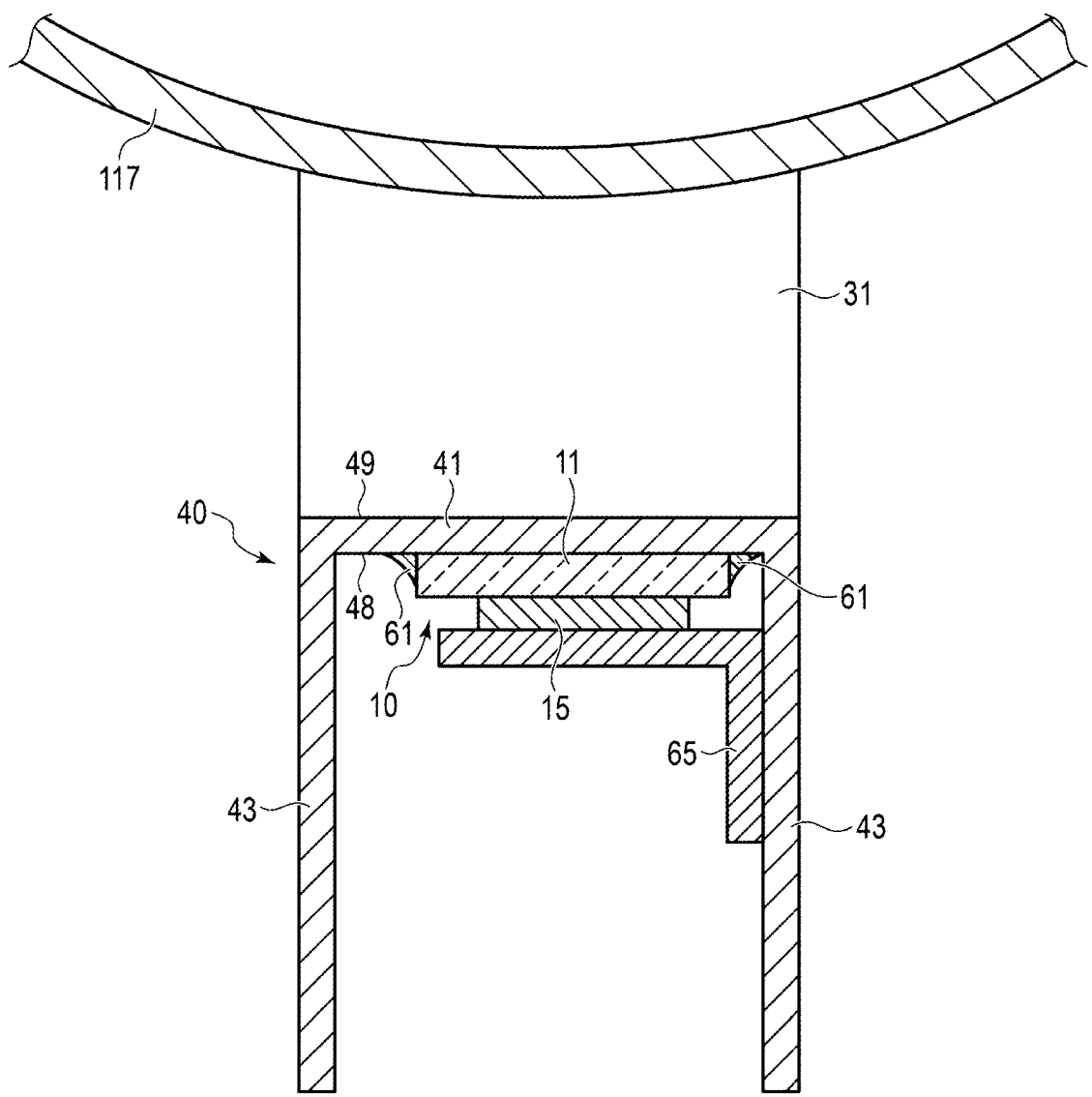
FIG. 8 is a sectional view taken along an A-A line of the print head illustrated in FIG. 7.
Figure 9:
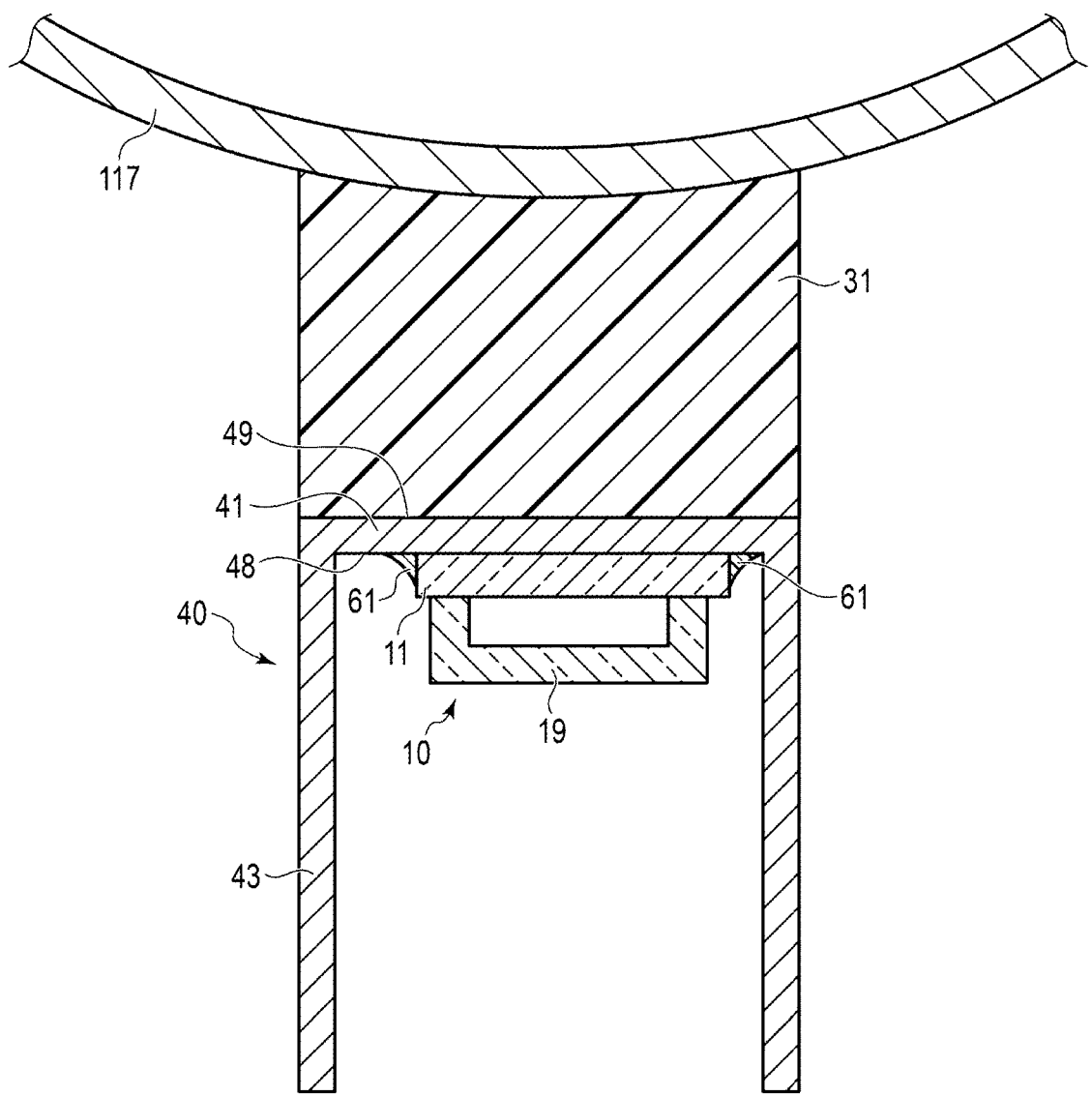
FIG. 9 is a sectional view taken along a B-B line of the print head.
Figure 10:
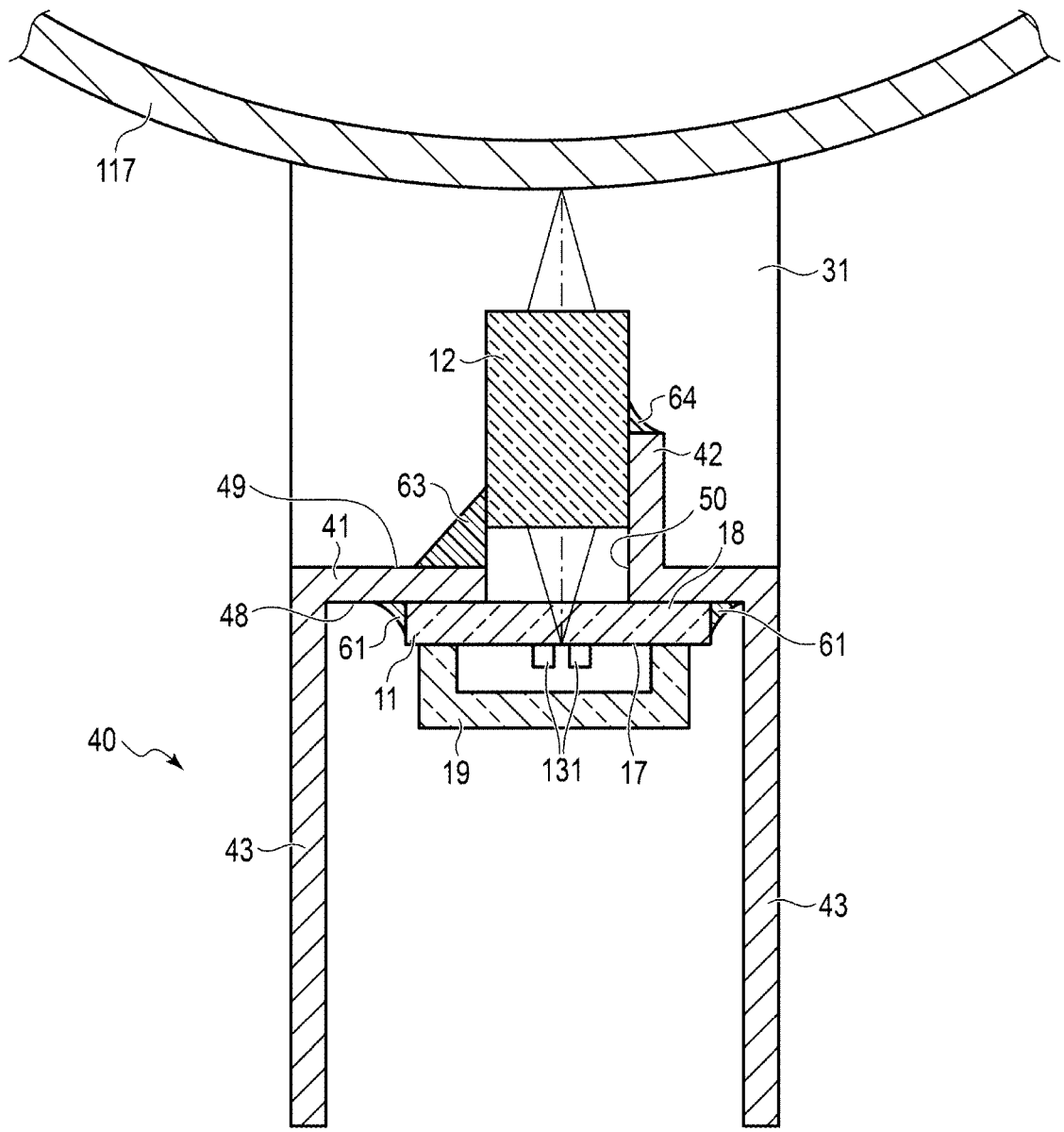
FIG. 10 is a sectional view taken along a C-C line of the print head.

FIG. 8 is a sectional view taken along an A-A line of the print head 1 illustrated in FIG. 7. FIG. 9 is a sectional view taken along a B-B line of the print head 1 illustrated in FIG. 7. FIG. 10 is a sectional view taken along a C-C line of the print head 1 illustrated in FIG. 7.

As illustrated in FIGS. 8 to 10, the transparent substrate 11 of the light emitting section 10 is pressed against a lower surface 48 of the ceiling section 41 and positioned. Specifically, as illustrated in FIG. 10, the reference surface 18 on the opposite side of the formation surface 17 of the transparent substrate 11, on which the light emitting elements 131 are formed, comes into contact with the lower surface 48 of the ceiling section 41 of the holder 40 to be positioned. Further, the transparent substrate 11 of the light emitting section 10 is fixed by an adhesive 61 extending along the edges of the long sides of the transparent substrate 11. That is, the lower surface 48 of the ceiling section 41 is a surface that supports the transparent substrate 11 of the light emitting section 10. An upper surface 49 on the opposite side of the lower surface 48 of the ceiling section 41 of the holder 40 serves as a focus position reference for light emitted from the rod lens array 12. The gap spacers 31 are provided between the upper surface 49 of the ceiling section 41 of the holder 40 and the photoconductive drum 117.

As illustrated in FIG. 8, the control IC 15 of the light emitting section 10 is connected to the sidewall sections 43 of the holder 40 via a heat conduction member 65 (e.g., a heat sink). That is, the heat conduction member 65 is in contact with the control IC 15 of the light emitting section 10 and the sidewall sections 43 of the holder 40 and extends. The heat conduction member 65 allows heat (e.g., thermal energy) generated by the control IC 15 to escape to the holder 40. For example, the heat conduction member 65 is a metal tape. The heat generated by the control IC 15 is transmitted to the sidewall sections 43 of the holder 40 at high conductivity by the heat conduction member 65 and radiated from the holder 40.

As illustrated in FIG. 10, the rod lens array 12 is pressed against an inner side surface 50 of the supporting section 42 of the holder 40 and positioned, fixed to the ceiling section 41 by an adhesive 63 extending between the lower end portion of the long side of the rod lens array 12 and the upper surface 49 of the ceiling section 41, and fixed to the supporting section 42 by an adhesive 64 extending along the upper end of the supporting section 42. That is, the inner side surface 50 of the supporting section 42 is a surface that supports the rod lens array 12. The inner side surface 50 of the supporting section 42 forms a right angle with respect to the lower surface 48 of the ceiling section 41. The rod lens array 12 condenses, on the photoconductive drum 117, lights of the light emitting elements 131 passing through the transparent substrate 11.

Figure 11:
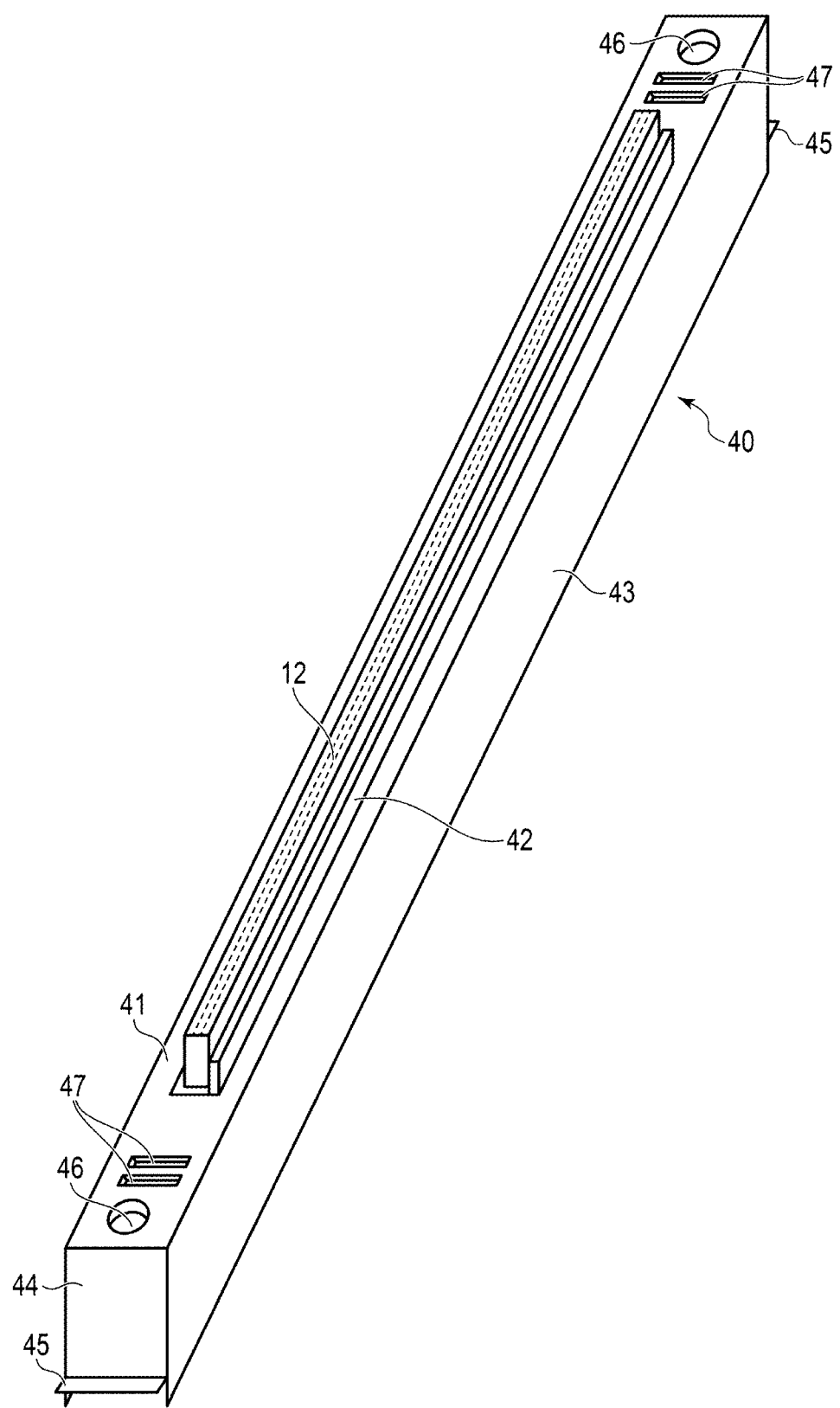
FIG. 11 is a perspective view of a holder and a rod lens array of the print head according to the first embodiment.
Figure 12:
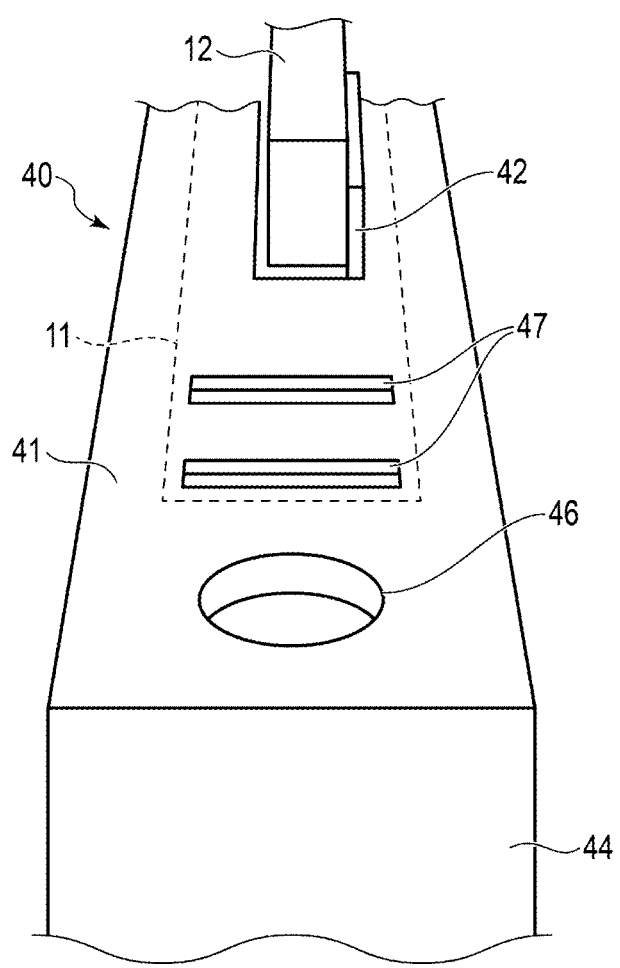
FIG. 12 is an enlarged perspective view of end portions of the holder and the rod lens array illustrated in FIG. 11.
Figure 13:
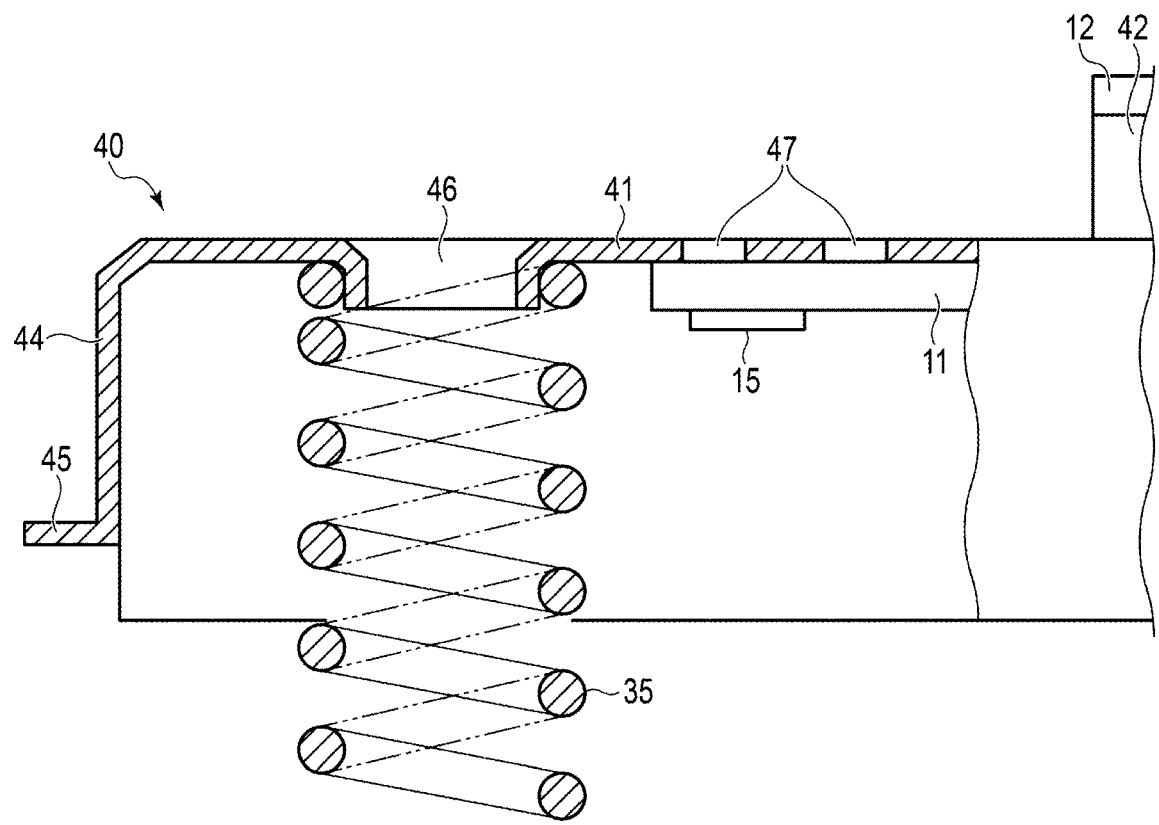
FIG. 13 is an enlarged sectional view of the end portion of the holder.

FIG. 11 is a perspective view of the holder 40 and the rod lens array 12 of the print head 1 according to the first embodiment. FIG. 12 is an enlarged perspective view illustrating end portions of the holder 40 and the rod lens array 12 illustrated in FIG. 11. FIG. 13 is an enlarged sectional view illustrating the end portion of the holder 40 illustrated in FIG. 11.

As illustrated in FIGS. 11 to 13, punched holes 46 and pouring holes 47 for pouring an adhesive are formed at both the end portions in the longitudinal direction of the holder 40. Since the punched holes 46 are formed by punching, the punched holes 46 each include a cylindrical flange that projects downward. The urging members 35 (for example, coil springs) are engaged around the punched holes 46 (e.g., such that the cylindrical flange is received within the urging member 35). Positional deviation of the urging members 35 is prevented by the engagement of the urging members 35 and the punched holes 46.

The pouring holes 47 are formed in portions of the ceiling section 41 located at both the end portions in the longitudinal direction of the transparent substrate 11 of the light emitting section 10. In addition to the adhesive 61, an adhesive for reinforcing the bonding of the transparent substrate 11 and the holder 40 is poured into the pouring holes 47 to further strengthen the bonding of the transparent substrate 11 and the holder 40.

Figure 14:
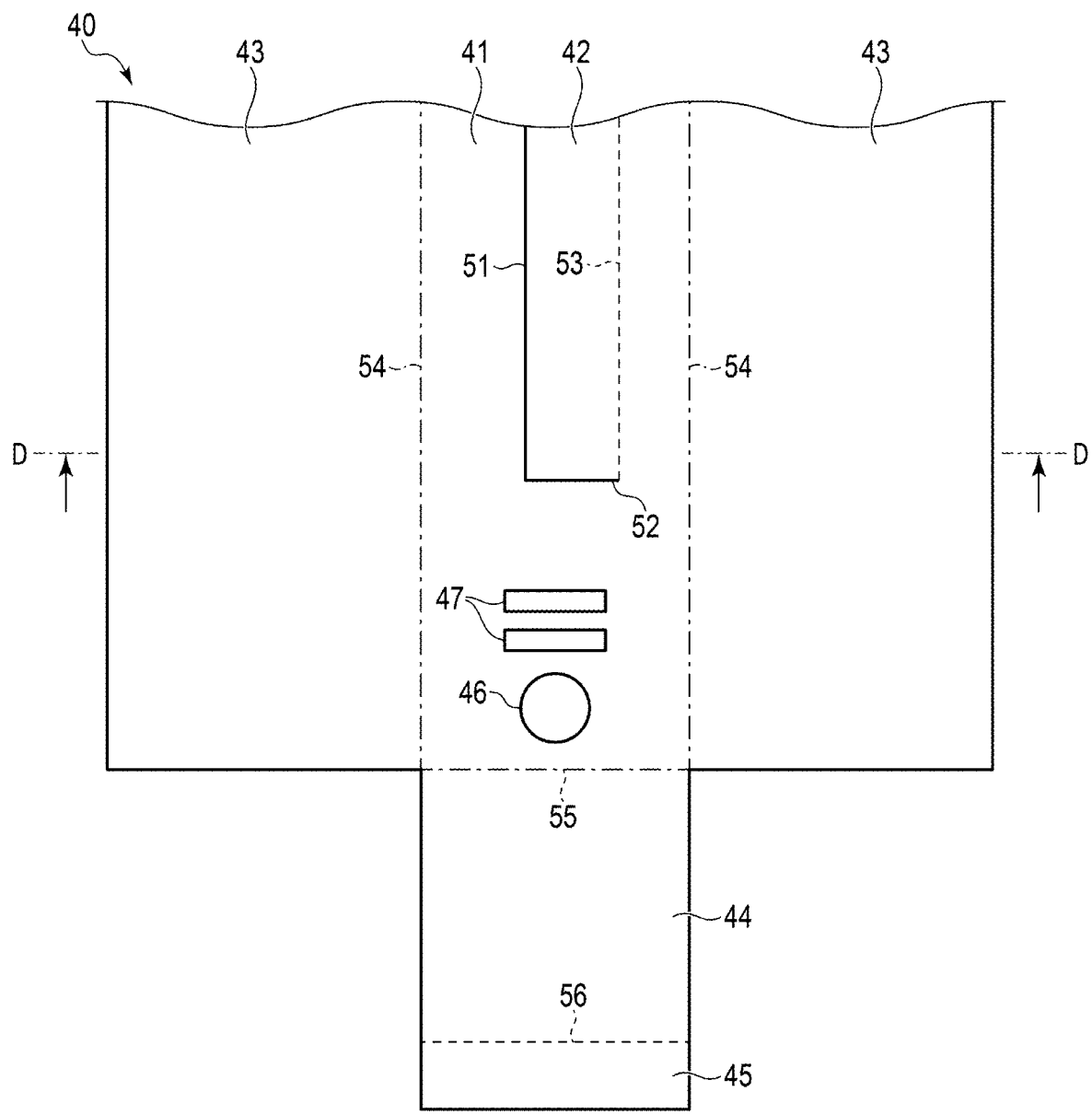
FIG. 14 is a diagram illustrating the holder of the print head before bending.
Figure 15:
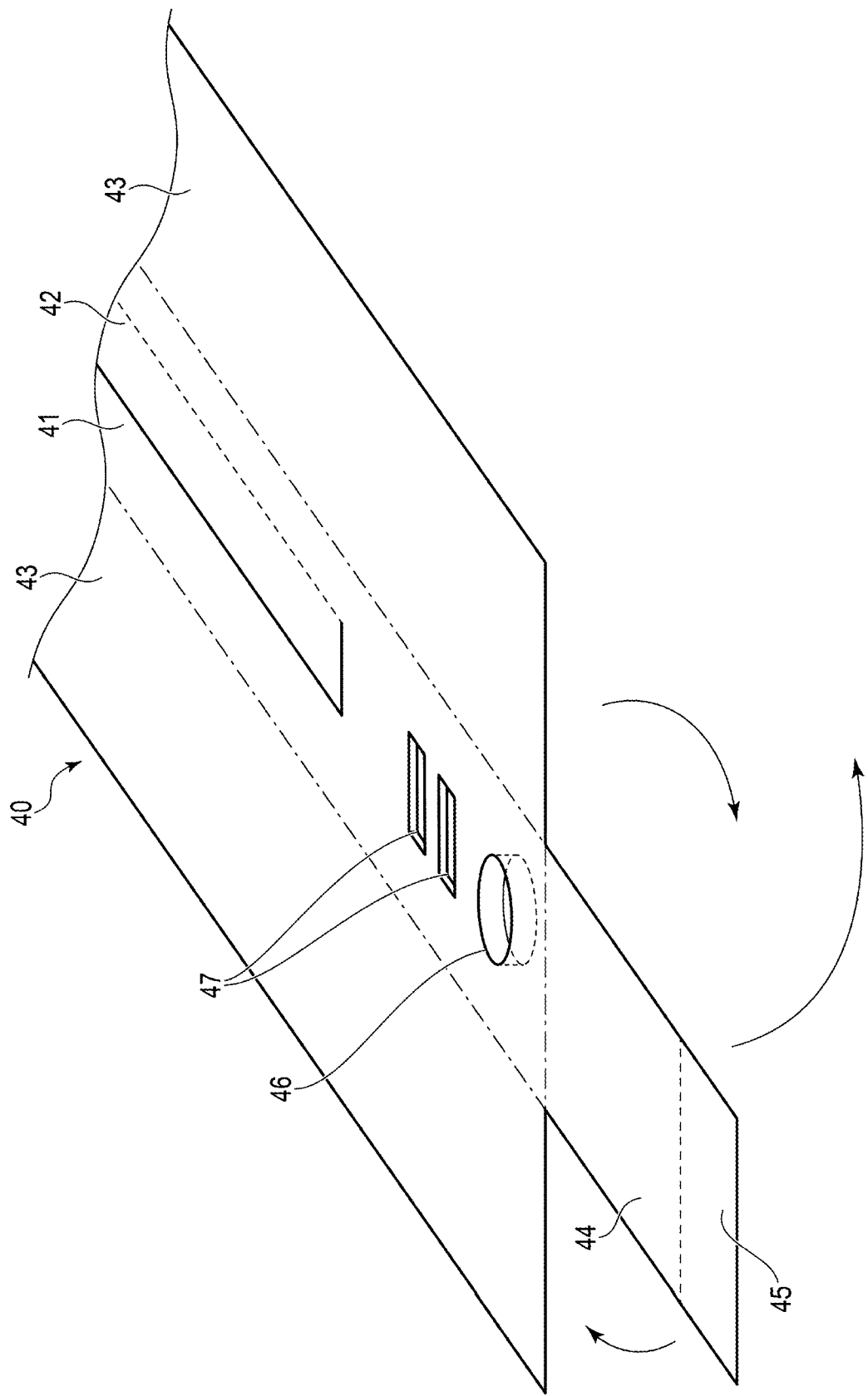
FIG. 15 is a perspective view illustrating a state of the bending of the holder illustrated in FIG. 14.
Figure 16:
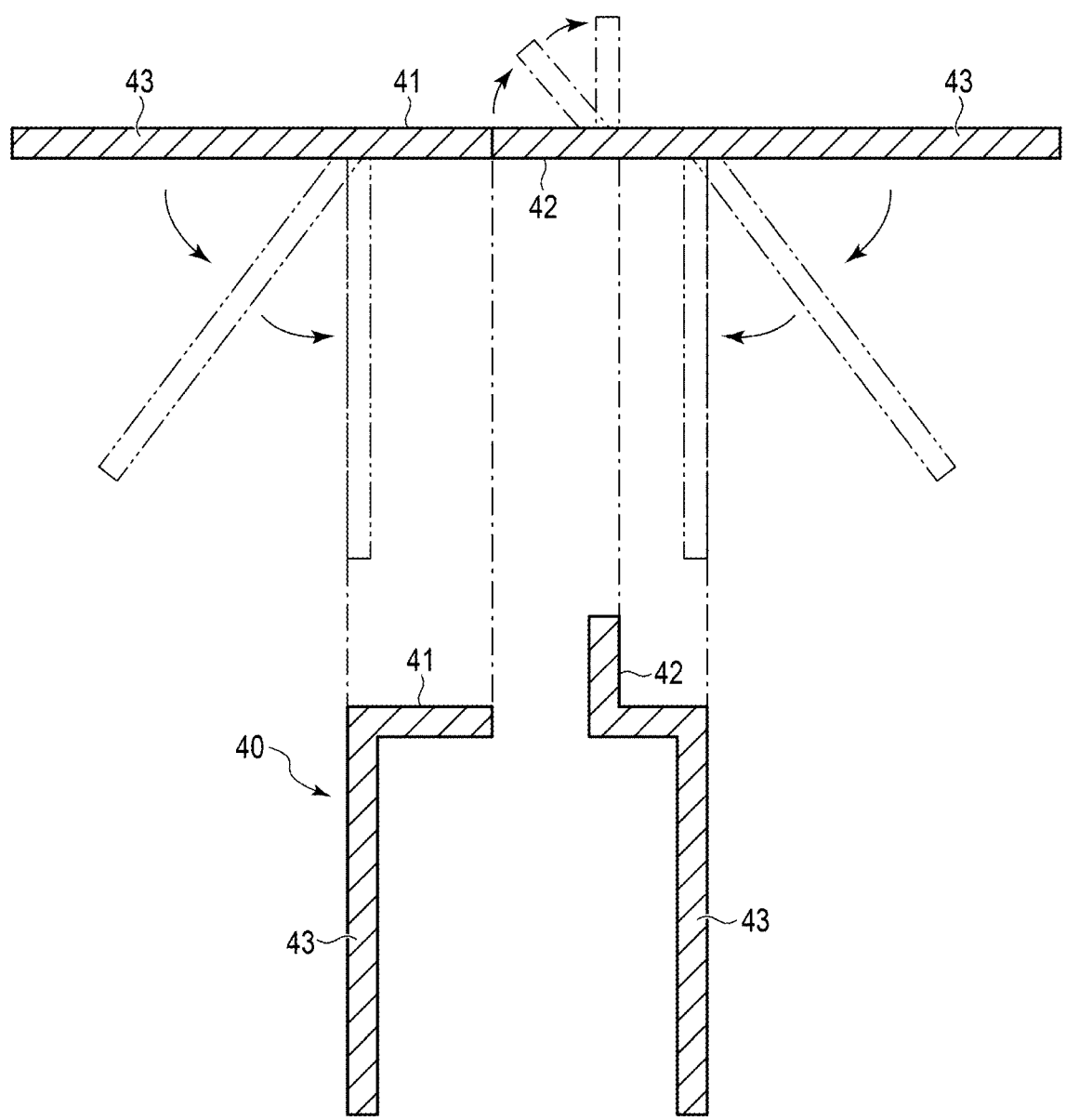
FIG. 16 is a sectional view illustrating a state of the bending of the holder in a cross section taken along a D-D line illustrated in FIG. 14.

The holder 40 is integrally formed from one metal plate (e.g., a single, continuous, unitary piece of sheet metal) by bending. FIG. 14 is a diagram illustrating the holder 40 of the print head 1 according to the first embodiment before the bending. FIG. 15 is a perspective view illustrating a state of the bending of the holder 40 illustrated in FIG. 14. FIG. 16 is a sectional view illustrating a state of the bending of the holder 40 in a cross section taken along a D-D line illustrated in FIG. 14.

The ceiling section 41 and the supporting section 42 are partially cut apart by a cutting line 51 and a cutting line 52. The supporting section 42 is bent at 90 degrees upward with respect to the ceiling section 41 along a valley fold line 53. The pair of sidewall sections 43 is respectively bent at 90 degrees downward with respect to the ceiling section 41 along mountain fold lines 54. The end wall section 44 is bent at 90 degrees downward with respect to the ceiling section 41 along a mountain fold line 55. The stopper 45 is bent at 90 degrees to the outer side with respect to the end wall section 44 along a valley fold line 56. The holder 40 is formed from one metal plate by such bending.

In this embodiment, the holder 40 is formed from one metal plate by bending. Therefore, the holder 40 can be manufactured at high machining accuracy and at low cost. Consequently, it is possible to obtain the print head 1 having high optical accuracy while avoiding a cost increase.

(Print Head According to a Second Embodiment)

Subsequently, a print head according to a second embodiment is explained with reference to FIGS. 17 to 25. In FIGS. 17 to 25, members denoted by the same reference numerals and signs as the reference numerals and signs of the members illustrated in FIGS. 6 to 16 are the same members. Detailed explanation of the members is omitted. Differences are emphatically explained below. That is, portions not explained below are the same as the portions in the first embodiment.

Figure 17:
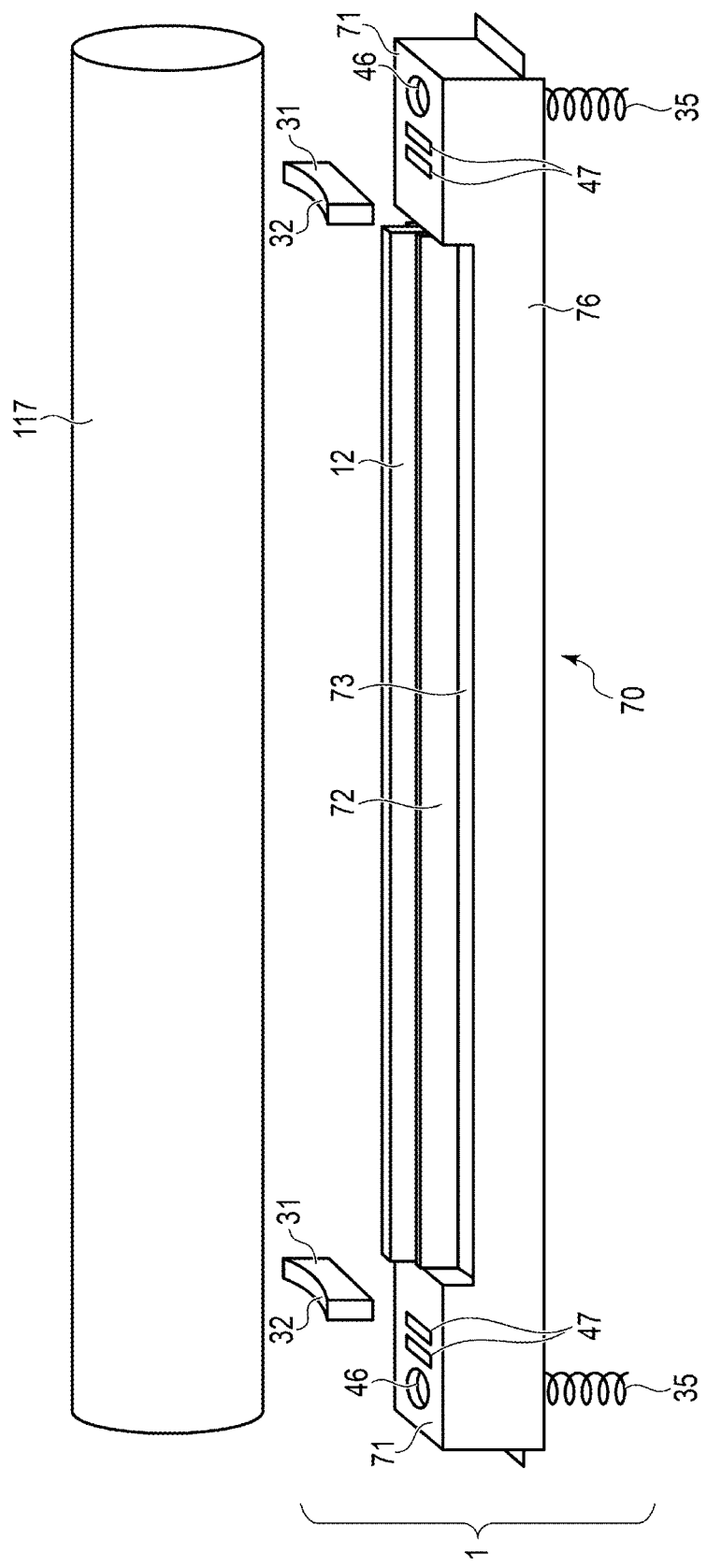
FIG. 17 is a perspective view illustrating an example of a print head according to a second embodiment.
Figure 18:
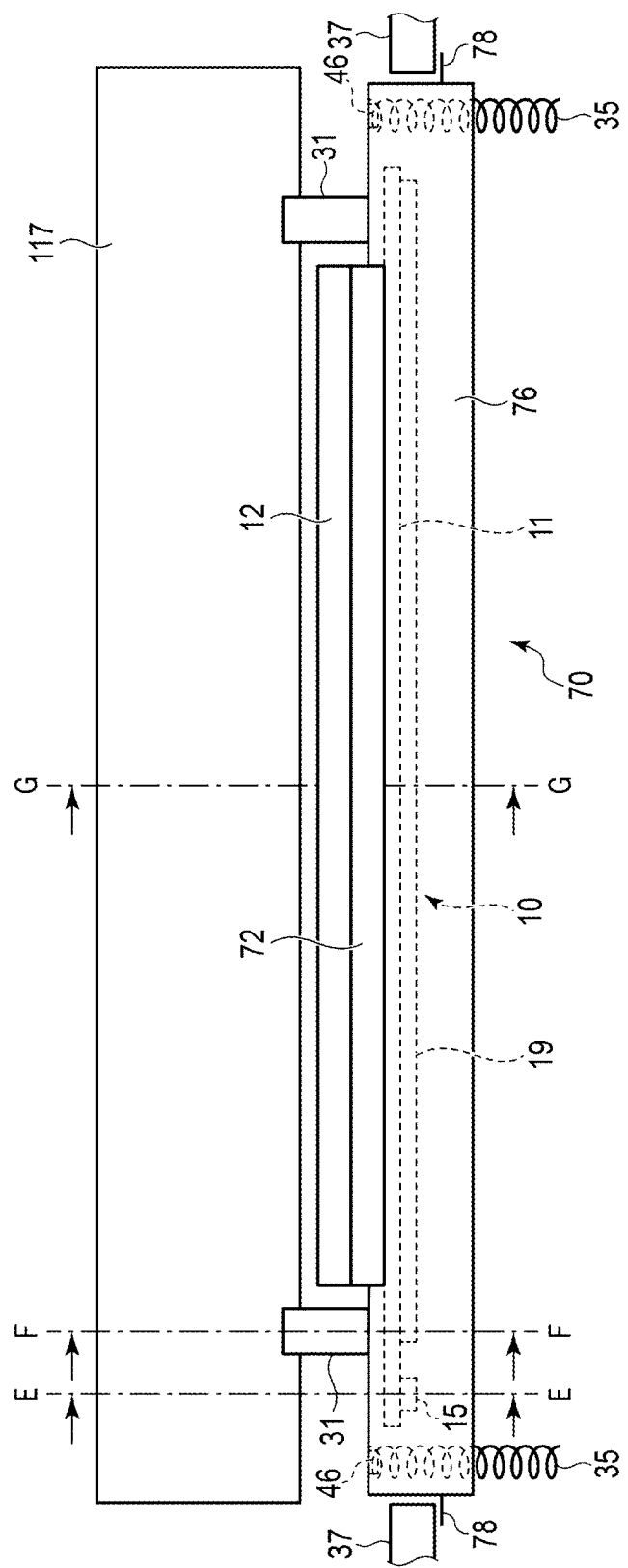
FIG. 18 is a side view illustrating the example of the print head.
Figure 19:
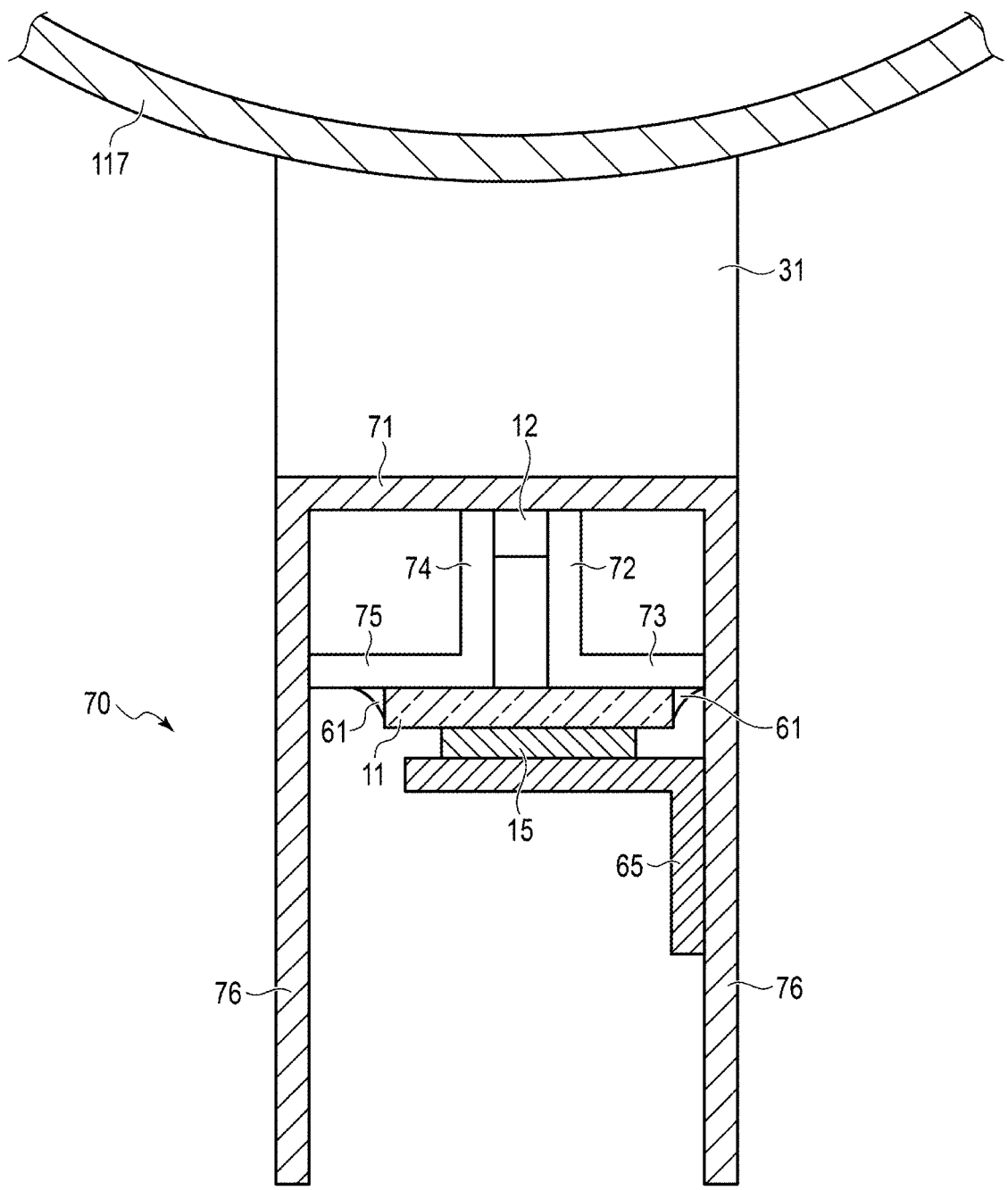
FIG. 19 is a sectional view taken along an E-E line of the print head illustrated in FIG. 18.
Figure 20:
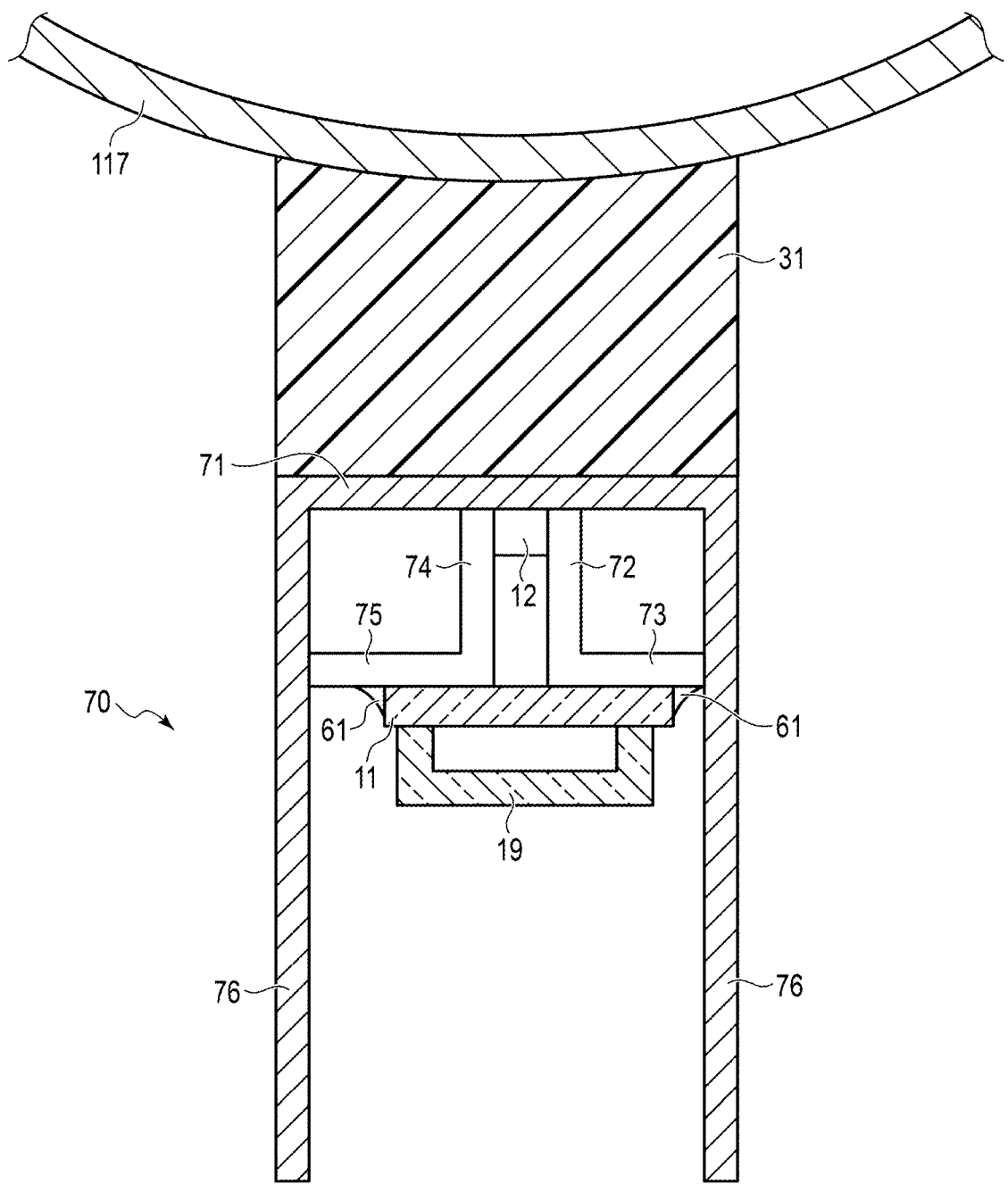
FIG. 20 is a sectional view taken along an F-F line of the print head.
Figure 21:
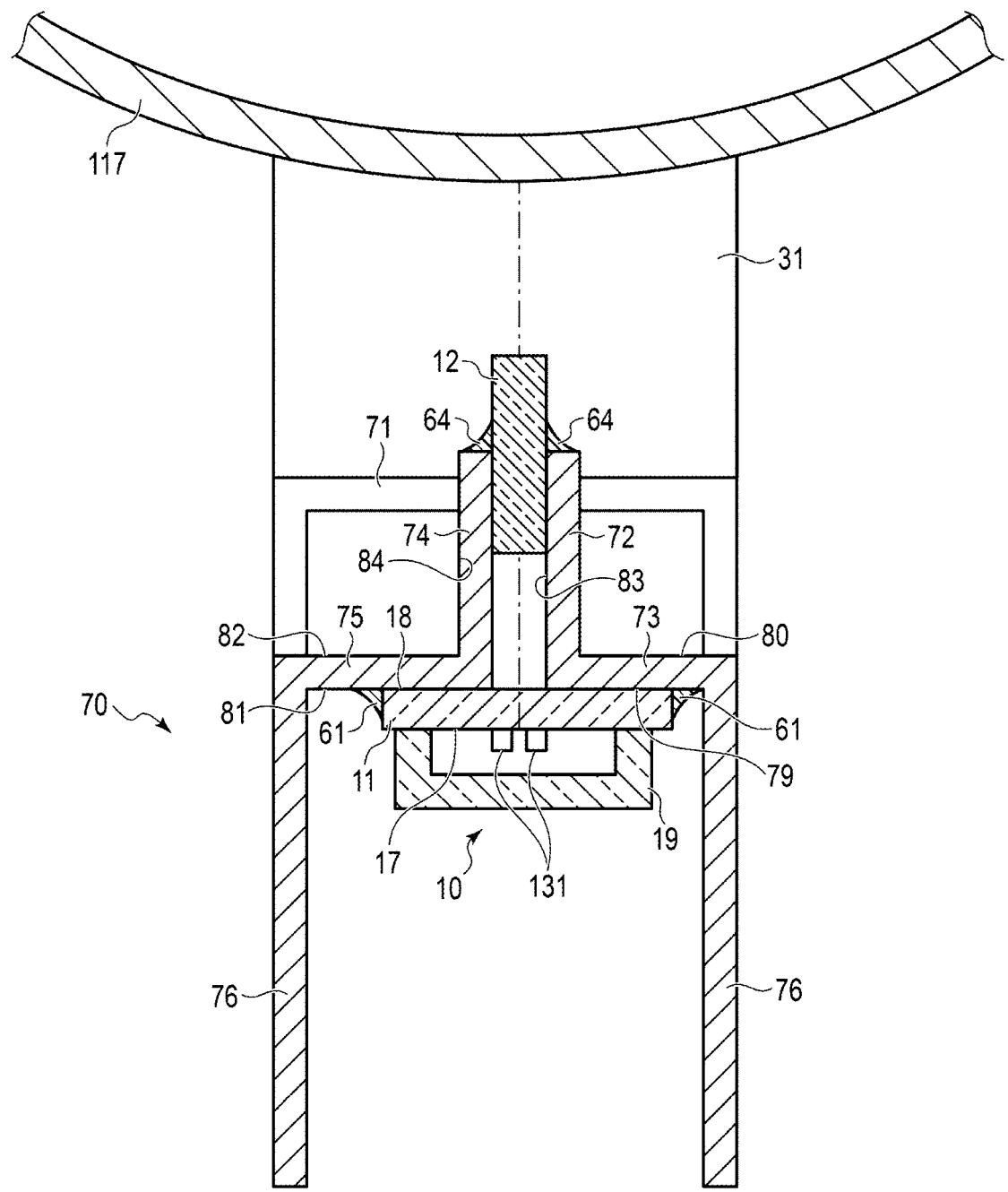
FIG. 21 is a sectional view taken along a G-G line of the print head.

FIG. 17 is a perspective view illustrating an example of the print head 1 according to the second embodiment. FIG. 18 is a side view illustrating an example of the print head 1 according to the second embodiment. In FIGS. 17 and 18, the photoconductive drum 117 of the image forming apparatus mounted with the print head 1 is also drawn. FIG. 19 is a sectional view taken along an E-E line of the print head 1 illustrated in FIG. 18. FIG. 20 is a sectional view taken along an F-F line of the print head 1 illustrated in FIG. 18. FIG. 21 is a sectional view taken along a G-G line of the print head 1 illustrated in FIG. 18.

As illustrated in FIGS. 17 to 21, the print head 1 includes the light emitting section 10, the rod lens array 12, and a holder 70 that holds the light emitting section 10 and the rod lens array 12. Configurations and the like of the light emitting section 10 and the rod lens array 12 are as explained above about the basic configuration of the print head.

The holder 70 has a generally rectangular parallelepiped box shape opened in a lower surface. That is, the holder 70 includes a pair of upper ceiling sections 71 facing the photoconductive drum 117 and lower ceiling sections 73 and 75. The pair of upper ceiling sections 71 is located at both the end portions in the longitudinal direction of the holder 70. The lower ceiling section 73 and the lower ceiling section 75 extend between the pair of upper ceiling sections 71 in the longitudinal direction of the holder 70 at an interval in the lateral direction of the holder 70. The lower ceiling sections 73 and 75 are located lower than the upper ceiling sections 71. The lower ceiling section 73 and the lower ceiling section 75 are located at the same height. For example, width dimensions of the lower ceiling section 73 and the lower ceiling section 75 are different in the drawings but may be the same. The pair of upper ceiling sections 71 and the lower ceiling sections 73 and 75 form a rectangular contour if viewed from above.

The holder 70 includes a pair of sidewall sections 76 extending along a pair of long sides of the upper ceiling sections 71 and the lower ceiling sections 73 and 75 and a pair of end wall sections 77 extending along short sides on the outer side of the pair of upper ceiling sections 71. The sidewall sections 76 extend downward perpendicularly to the upper ceiling sections 71 from the pair of long sides of the upper ceiling sections 71 and the lower ceiling sections 73 and 75. The end wall sections 77 extend downward perpendicularly to the upper ceiling sections 71 from the short sides on the outer side of the upper ceiling sections 71. The pair of sidewall sections 76 and the pair of end wall sections 77 form a rectangular frame. The holder 70 includes, in lower parts of the pair of end wall sections 77, stoppers 78 extending to the outer side perpendicularly to the end wall sections 77.

As illustrated in FIG. 17, the holder 70 includes, in the upper ceiling sections 71, the pouring holes 47 for pouring an adhesive. Configurations, functions, and the like of the pouring holes 47 are as explained in the first embodiment.

As illustrated in FIGS. 17 and 18, the holder 70 includes the punched holes 46 in the upper ceiling sections 71. The print head 1 includes the pair of gap spacers 31 and the pair of urging members 35. Configurations, functions, and the like of the gap spacers 31, the urging members 35, and the punched holes 46 are as explained in the first embodiment.

As illustrated in FIG. 18, the stopper receivers 37 are provided above the stoppers 78. Configurations, functions, and the like of the stoppers 78 and the stopper receivers 37 are as explained in the first embodiment.

As illustrated in FIG. 21, the transparent substrate 11 of the light emitting section 10 is pressed against a lower surface 79 of the lower ceiling section 73 and a lower surface 81 of the lower ceiling section 75 of the holder 70 and positioned. Specifically, the reference surface 18 on the opposite side of the formation surface 17 of the transparent substrate 11, on which the light emitting elements 131 are formed, comes into contact with the lower surface 79 of the lower ceiling section 73 and the lower surface 81 of the lower ceiling section 75 of the holder 70 to be positioned. Further, the transparent substrate 11 of the light emitting section 10 is fixed by the adhesive 61 extending along the edges of the long sides of the transparent substrate 11. The lower surface 79 of the lower ceiling section 73 and the lower surface 81 of the lower ceiling section 75 are surfaces that support the transparent substrate 11 of the light emitting section 10. An upper surface 80 on the opposite side of the lower surface 79 of the lower ceiling section 73 and an upper surface 82 on the opposite side of the lower surface 81 of the lower ceiling section 75 of the holder 70 serve as a focus position reference for light emitted from the rod lens array 12. The gap spacers 31 are provided between the upper ceiling sections 71 of the holder 70 and the photoconductive drum 117.

As illustrated in FIG. 19, the control IC 15 of the transparent substrate 11 of the light emitting section 10 is connected to the sidewall sections 76 of the holder 70 via the heat conduction member 65. That is, the heat conduction member 65 is in contact with the control IC 15 of the light emitting section 10 and the sidewall sections 76 of the holder 70 and extends. The heat conduction member 65 allows heat generated by the control IC 15 to escape to the holder 70. For example, the heat conduction member 65 is a metal tape. The heat generated by the control IC 15 is transmitted to the sidewall sections 76 of the holder 70 at high conductivity by the heat conduction member 65 and radiated from the holder 70.

As illustrated in FIG. 21, the holder 70 includes a pair of supporting sections 72 and 74 extending along the long sides on the inner sides of the pair of lower ceiling sections 73 and 75 and extending upward perpendicularly to the pair of lower ceiling sections 73 and 75. The pair of supporting sections 72 and 74 has the same height and extends in parallel to each other. The interval between the pair of supporting sections 72 and 74 is set equal to the width dimension of the rod lens array 12. The rod lens array 12 is held and positioned by the pair of supporting sections 72 and 74. In other words, the rod lens array 12 is in surface contact with inner side surfaces 83 and 84 of the pair of supporting sections 72 and 74 and positioned. Further, the rod lens array 12 is fixed to the supporting sections 72 and 74 by the adhesive 64 extending along the upper ends of the supporting sections 72 and 74. That is, the inner side surfaces 83 and 84 of the supporting sections 72 and 74 are surfaces that support the rod lens array 12. The inner side surfaces 83 and 84 of the supporting sections 72 and 74 form a right angle with respect to the lower surfaces 79 and 81 of the lower ceiling sections 73 and 75. The rod lens array 12 condenses, on the photoconductive drum 117, lights of the light emitting elements 131 passing through the transparent substrate 11.

In this embodiment, the transparent substrate 11 of the light emitting section 10 is fixed to the lower ceiling section 73 and the lower ceiling section 75 of the holder 70 in a lower position compared with the position of the transparent substrate 11 in the first embodiment. Therefore, in this embodiment, the distance from the light emitting elements 131 of the light emitting section 10 to the photoconductive drum 117 is longer compared with the distance in the first embodiment. Therefore, the holder 70 in this embodiment is suitable if the rod lens array 12 having a longer focal length is used, compared with the rod lens array 12 of the holder 40 in the first embodiment.

Figure 22:
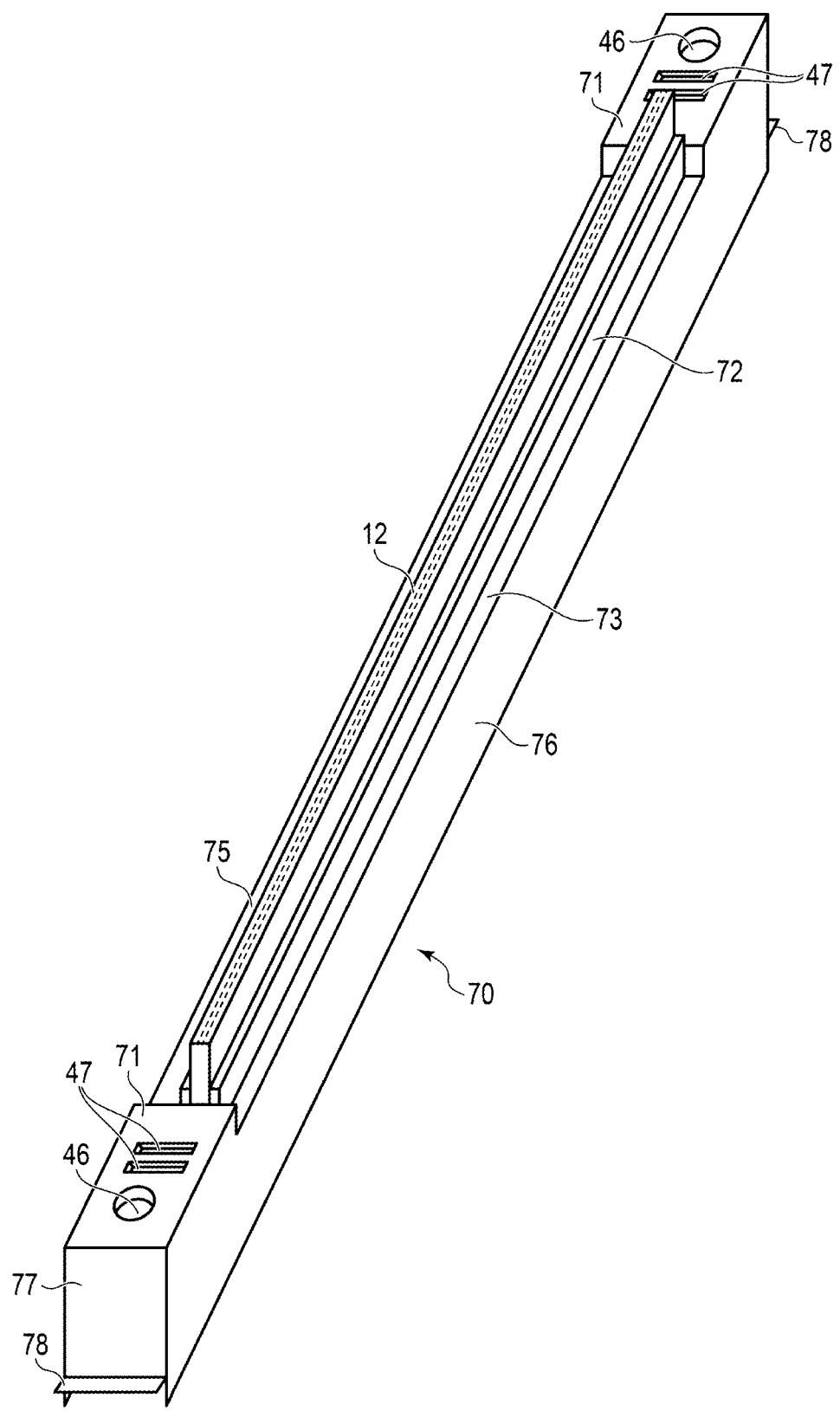
FIG. 22 is a perspective view of a holder and a rod lens array of the print head according to the second embodiment.
Figure 23:
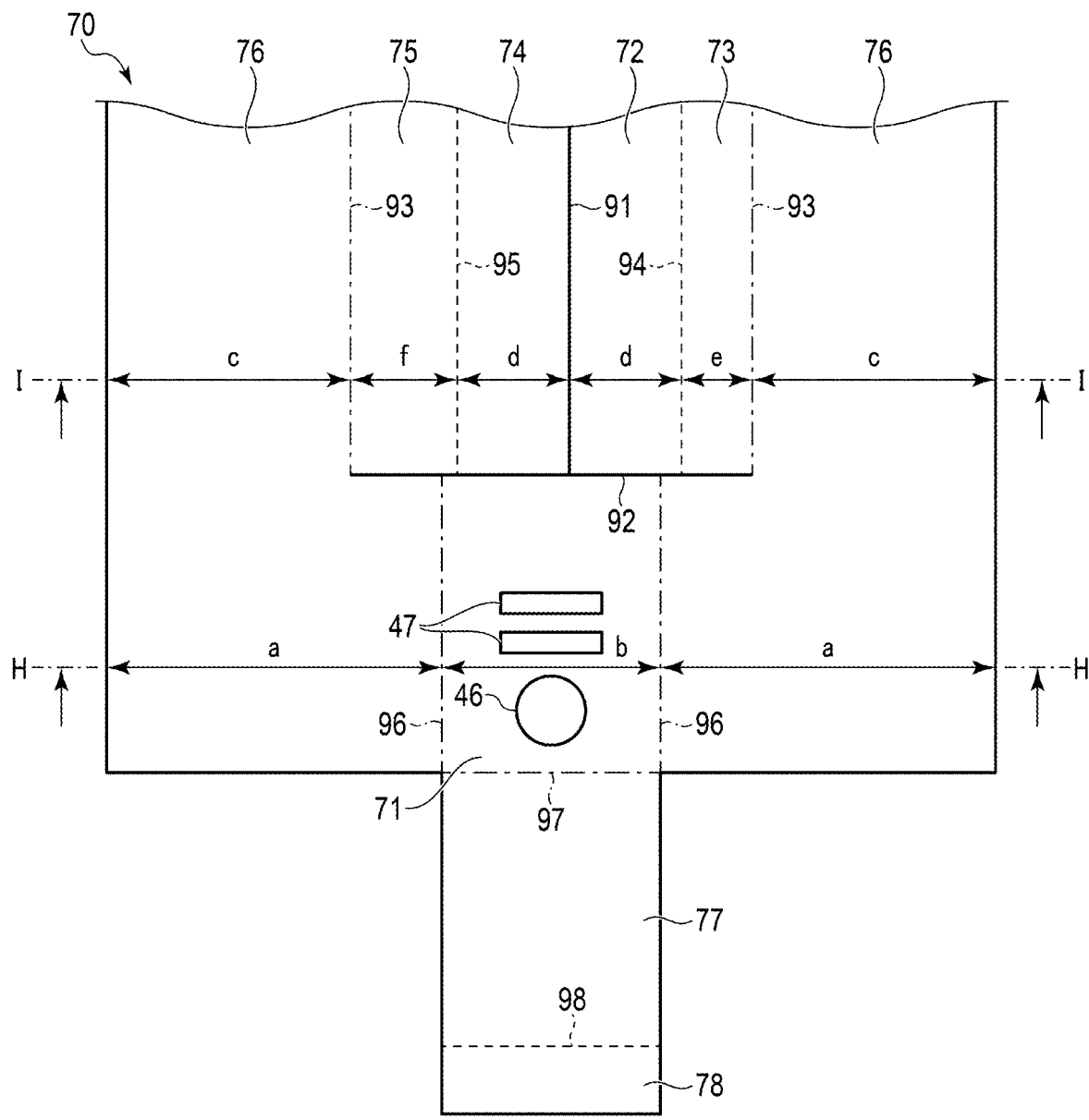
FIG. 23 is a diagram illustrating the holder of the print head before bending.
Figure 24:
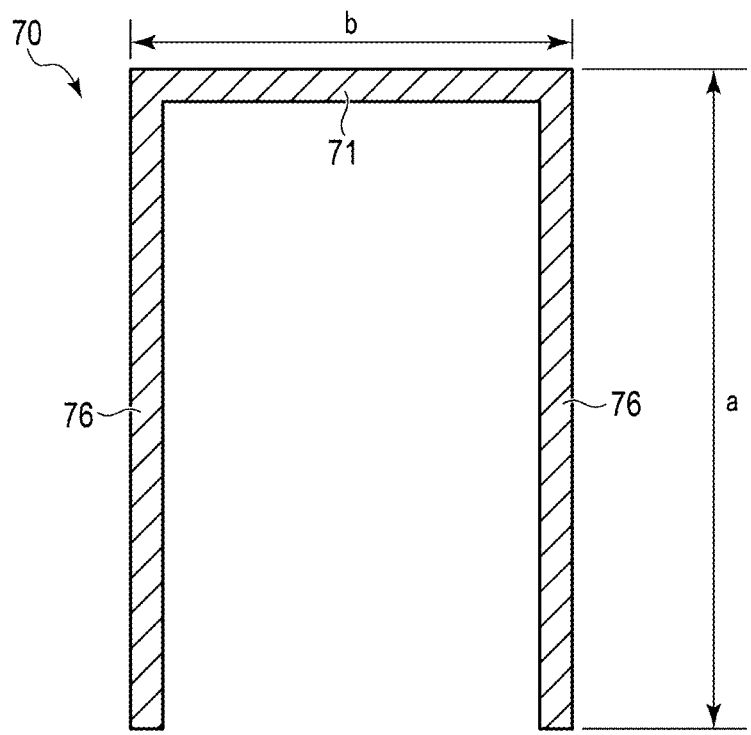
FIG. 24 is a sectional view of the holder after the bending taken along an H-H line illustrated in FIG. 23.
Figure 25:
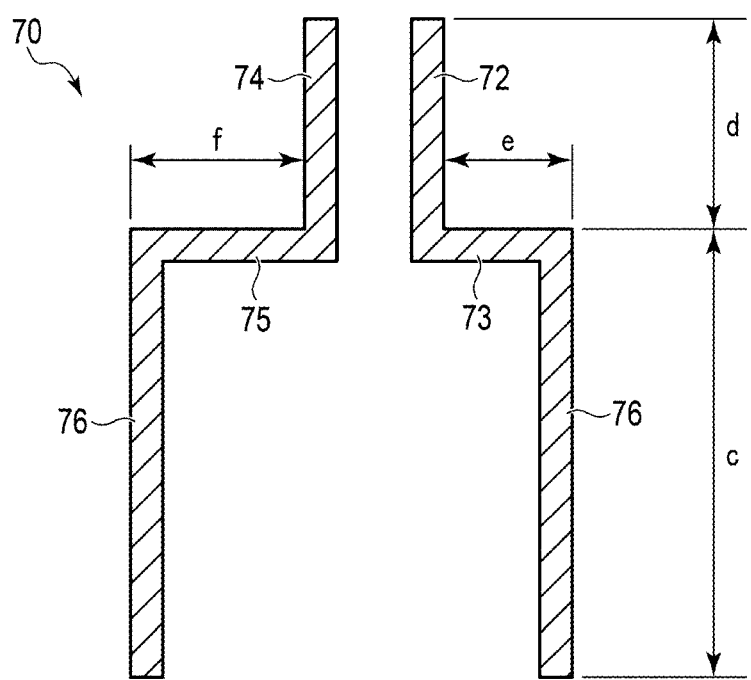
FIG. 25 is a sectional view of the holder after the bending taken along an I-I line illustrated in FIG. 23.

FIG. 22 is a perspective view of the holder 70 and the rod lens array 12 of the print head 1 according to the second embodiment. The holder 70 is formed from one metal plate by bending. FIG. 23 is a diagram illustrating the holder 70 of the print head 1 according to the second embodiment before the bending. FIG. 24 is a sectional view of the holder 70 after the bending taken along an H-H line illustrated in FIG. 23. FIG. 25 is a sectional view of the holder 70 after the bending taken along an I-I line illustrated in FIG. 23.

The pair of supporting sections 72 and 74 is cut apart by a cutting line 91. The supporting sections 72 and 74 and the lower ceiling sections 73 and 75 are partially cut apart from the upper ceiling section 71 and the sidewall sections 76 by a cutting line 92.

For example, first, the pair of sidewall sections 76 is respectively bent at 90 degrees downward with respect to the upper ceiling section 71 along mountain fold lines 96. Subsequently, the supporting section 72 is bent at 90 degrees to the outer side with respect to the lower ceiling section 73 along a valley fold line 94. The supporting section 74 is bent at 90 degrees to the outer side with respect to the lower ceiling section 75 along a valley fold line 95. Subsequently, the pair of lower ceiling sections 73 and 75 is respectively bent at 90 degrees to the inner side with respect to the sidewall sections 76 along mountain fold lines 93.

The end wall section 77 is bent at 90 degrees downward with respect to the upper ceiling section 71 along a mountain fold line 97. The stopper 78 is bent at 90 degrees to the outer side with respect to the end wall section 77 along a valley fold line 98.

The holder 70 is formed from one metal plate by such bending.

In FIGS. 23 to 25, as an example, a height dimension of the sidewall sections 76 at the end portions in the longitudinal direction of the holder 70 is represented as "a", a width dimension of the upper ceiling section 71 is represented as "b", a height dimension of the sidewall sections 76 in the center in the longitudinal direction of the holder 70 is represented as "c", a height dimension of the supporting sections 72 and 74 is represented as "d", a width dimension of the lower ceiling section 73 is represented as "e", and a width dimension of the lower ceiling section 75 is represented as "f".

In this embodiment, as in the first embodiment, the holder 70 is formed from one metal plate by bending. Therefore, the holder 70 can be manufactured at high machining accuracy and at low cost. Consequently, it is possible to obtain the print head 1 having high optical accuracy while avoiding a cost increase.

In this embodiment, the transparent substrate 11 of the light emitting section 10 is fixed to the lower ceiling section 73 and the lower ceiling section 75 of the holder 70 in a lower position compared with the position of the transparent substrate 11 in the first embodiment. Therefore, the holder 70 in this embodiment is suitable if the rod lens array 12 having a longer focal length is used, compared with the rod lens array 12 of the holder 40 in the first embodiment. That is, the holder 70 in this embodiment is suitable for the print head 1 in which the rod lens array 12 having a long focal length that easily obtains a high optical characteristics is used.

(Image Forming Apparatus)

Figure 26:
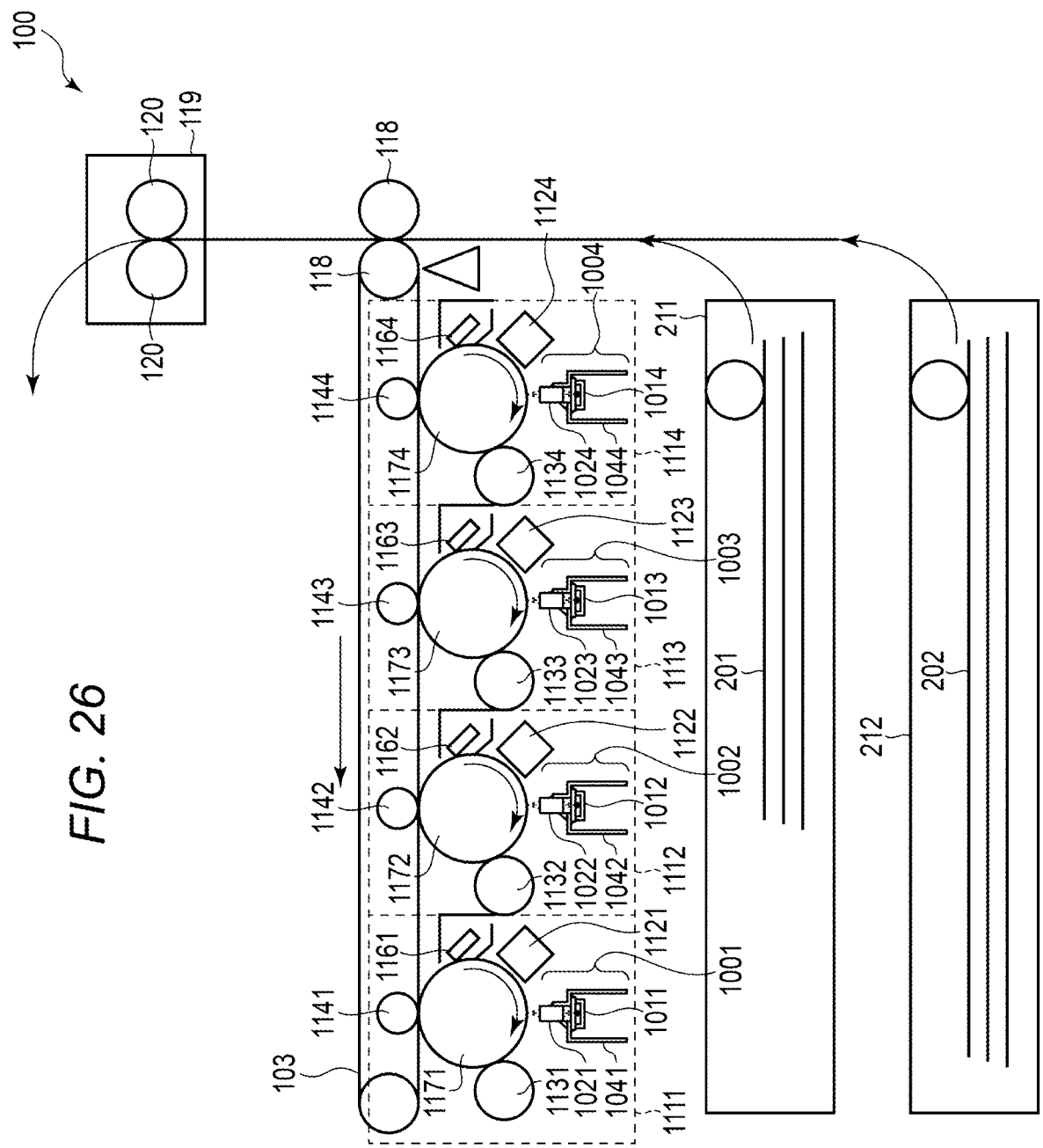
FIG. 26 is a diagram illustrating an example of an image forming apparatus including the print head according to the first embodiment.

Subsequently, an image forming apparatus is explained with reference to FIG. 26. FIG. 26 is a diagram illustrating an example of an image forming apparatus 100 mounted with the print head 1 according to the first embodiment. The print head according to the second embodiment may be mounted on the image forming apparatus 100 instead of the print head according to the first embodiment. FIG. 26 is an example of a color image forming apparatus of a quadruple tandem type. However, the print head 1 in the embodiment can be applied to a monochrome image forming apparatus as well.

As illustrated in FIG. 26, for example, the image forming apparatus 100 includes an image forming unit 1111 that forms a yellow (Y) image, an image forming unit 1112 that forms a magenta (M) image, an image forming unit 1113 that forms a cyan (C) image, and an image forming unit 1114 that forms a black (K) image. The image forming units 1111, 1112, 1113, and 1114 respectively form the yellow, cyan, magenta, and black images and transfer the images onto a transfer belt 103. Consequently, a full-color image is formed on the transfer belt 103.

The image forming unit 1111 that forms the yellow (Y) image includes a print head 1001. The print head 1001 includes a light emitting section 1011, a rod lens array 1021, and a holder 1041. Further, the image forming unit 1111 includes an electrifying charger 1121, the print head 1001, a developing device 1131, a transfer roller 1141, and a cleaner 1161 around a photoconductive drum 1171. The print head 1001 corresponds to the print head 1, the light emitting section 1011 corresponds to the light emitting section 10, the rod lens array 1021 corresponds to the rod lens array 12, the holder 1041 corresponds to the holder 40, and the photoconductive drum 1171 corresponds to the photoconductive drum 117. Explanation of the print head 1001, the light emitting section 1011, the rod lens array 1021, the holder 1041, and the photoconductive drum 1171 is omitted.

The image forming unit 1112 that forms the magenta (M) image includes a print head 1002. The print head 1002 includes a light emitting section 1012, a rod lens array 1022, and a holder 1042. Further, the image forming unit 1112 includes an electrifying charger 1122, the print head 1002, a developing device 1132, a transfer roller 1142, and a cleaner 1162 around a photoconductive drum 1172. The print head 1002 corresponds to the print head 1, the light emitting section 1012 corresponds to the light emitting section 10, the rod lens array 1022 corresponds to the rod lens array 12, the holder 1042 corresponds to the holder 40, and the photoconductive drum 1172 corresponds to the photoconductive drum 117. Explanation of the print head 1002, the light emitting section 1012, the rod lens array 1022, the holder 1042, and the photoconductive drum 1172 is omitted.

The image forming unit 1113 that forms the cyan (C) image includes a print head 1003. The print head 1003 includes a light emitting section 1013, a rod lens array 1023, and a holder 1043. Further, the image forming unit 1113 includes an electrifying charger 1123, the print head 1003, a developing device 1133, a transfer roller 1143, and a cleaner 1163 around a photoconductive drum 1173. The print head 1003 corresponds to the print head 1, the light emitting section 1013 corresponds to the light emitting section 10, the rod lens array 1023 corresponds to the rod lens array 12, the holder 1043 corresponds to the holder 40, and the photoconductive drum 1173 corresponds to the photoconductive drum 117. Explanation of the print head 1003, the light emitting section 1013, the rod lens array 1023, the holder 1043, and the photoconductive drum 1173 is omitted.

The image forming unit 1114 that forms the black (K) image includes a print head 1004. The print head 1004 includes a light emitting section 1014, a rod lens array 1024, and a holder 1044. Further, the image forming unit 1114 includes an electrifying charger 1124, the print head 1004, a developing device 1134, a transfer roller 1144, and a cleaner 1164 around a photoconductive drum 1174. The print head 1004 corresponds to the print head 1, the light emitting section 1014 corresponds to the light emitting section 10, the rod lens array 1024 corresponds to the rod lens array 12, the holder 1044 corresponds to the holder 40, and the photoconductive drum 1174 corresponds to the photoconductive drum 117. Explanation of the print head 1004, the light emitting section 1014, the rod lens array 1024, the holder 1044, and the photoconductive drum 1174 is omitted.

The electrifying chargers 1121, 1122, 1123, and 1124 respectively uniformly charge the photoconductive drums 1171, 1172, 1173, and 1174. The print heads 1001, 1002, 1003, and 1004 expose, with emitted lights of the light emitting elements 131 of the first light emitting element rows 1301 and the second light emitting element rows 1302 of the print heads 1001, 1002, 1003, and 1004, the respective photoconductive drums 1171, 1172, 1173, and 1174 and form electrostatic latent images on the photoconductive drums 1171, 1172, 1173, and 1174. The developing device 1131, the developing device 1132, the developing device 1133, and the developing device 1134 respectively deposit yellow toner, magenta toner, cyan toner, and black toner on electrostatic latent image portions of the respective photoconductive drums 1171, 1172, 1173, and 1174 (develop the electrostatic latent images).

The transfer rollers 1141, 1142, 1143, and 1144 transfer toner images developed on the photoconductive drums 1171, 1172, 1173, and 1174 onto the transfer belt 103. The cleaners 1161, 1162, 1163, and 1164 clean toners remaining on the photoconductive drums 1171, 1172, 1173, and 1174 without being transferred and enter a standby state for the next image formation.

Paper (an image formation medium or sheet) 201 of a first size (a small size) is stored in a paper cassette 211, which is a paper supply section. Paper (an image formation medium) 202 of a second size (a large size) is stored in a paper cassette 212, which is a paper supply section.

The toner images are transferred onto, from the transfer belt 103, by a transfer roller pair 118, which is a transfer section, the paper 201 picked up from the paper cassette 211 or the paper 202 picked up from the paper cassette 212. The paper 201 or the paper 202 having the toner images transferred thereon is heated and pressurized by a fixing roller 120 of a fixing section 119. The toner images are firmly fixed on the paper 201 or the paper 202 by the heating and the pressurization in the fixing roller 120. An image forming operation is continuously performed by repeating the process operation explained above.

As explained above, according to the embodiments, it is possible to provide the print head 1 having high optical accuracy while avoiding a cost increase.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A print head comprising:
    a transparent substrate on which a light emitting element is formed;
    a lens configured to condense light emitted from the light emitting element and passing through the transparent substrate; and a holder including a first supporting surface that supports the transparent substrate and a second supporting surface that supports the lens, the holder being formed from a single, continuous piece of material by bending, wherein a surface of the holder on an opposite side of the first supporting surface serves as a focus position reference for light emitted from the lens.

2. The print head of claim 1, wherein the first supporting surface of the holder is substantially perpendicular to the second supporting surface.

3. The print head of claim 1, wherein:
the holder further includes a third supporting surface that supports the lens; and
the second supporting surface is substantially parallel to the third supporting surface.

4. The print head of claim 1, further comprising a gap spacer engaging the surface of the holder that is on the opposite side of the first supporting surface.

5. The print head of claim 4, further comprising a biaser positioned to urge the holder toward the opposite side of the first supporting surface,
wherein the holder includes a punched hole that engages the biaser and limits positional deviation of the biaser.

6. The print head of claim 5, wherein the punched hole includes a cylindrical flange that is received within the biaser.

7. The print head of claim 5, wherein the biaser and the gap spacer are positioned on opposite sides of the first supporting surface.

8. A print head comprising:
a transparent substrate having a first principal surface on which a light emitting element is formed and a second principal surface on an opposite side of the first principal surface of the transparent substrate;
a lens configured to condense light emitted from the light emitting element and passing through the transparent substrate; and
a holder including a first supporting surface that supports the transparent substrate and a second supporting surface that supports the lens, the holder being formed from a single, continuous piece of material by bending, wherein the second principal surface is in contact with the first supporting surface of the holder.

9. A print head comprising:
a transparent substrate on which a light emitting element is formed;
a control integrated circuit (IC) formed on the transparent substrate;
a lens configured to condense light emitted from the light emitting element and passing through the transparent substrate;
a holder including a first supporting surface that supports the transparent substrate and a second supporting surface that supports the lens, the holder being formed from a single, continuous piece of material by bending; and
a heat conduction member positioned to conduct thermal energy from the control IC to the holder.

10. The print head of claim 9, wherein the heat conduction member is in contact with the control IC and the holder.

11. A print head comprising:
a transparent substrate on which a light emitting element is formed;
a lens configured to condense light emitted from the light emitting element and passing through the transparent substrate; and
a holder including a first supporting surface that supports the transparent substrate and a second supporting surface that supports the lens, the holder being formed from a single, continuous piece of material by bending, wherein the holder defines an adhesive pouring hole at an end portion of the transparent substrate, the adhesive pouring hole forming a path for an adhesive to enter between the holder and the transparent substrate.

12. A print head comprising:
a transparent substrate;
a light emitting element coupled to the transparent substrate;
a lens positioned to receive light from the light emitting element, the transparent substrate extending between the light emitting element and the lens; and
a holder including:
a body engaging the transparent substrate;
a first flange extending from the body in a first direction and supporting the lens, the body and the first flange being integrally formed; and
a second flange and a third flange that extend from the body in a second direction opposite the first direction, wherein the transparent substrate is received between the second flange and the third flange.

13. The print head of claim 12, further comprising:
an integrated circuit (IC) coupled to the transparent substrate; and
a heat conduction member engaging the IC and the second flange.

14. The print head of claim 12, further comprising a gap spacer having a first end defining a concave curved surface and a second end opposite the first end, wherein the transparent substrate engages a first side of the body and the second end of the gap spacer engages a second side of the body.

15. The print head of claim 12, wherein the holder further includes a fourth flange extending from the body and supporting the lens, the lens extending between the first flange and the fourth flange.

16. The print head of claim 12, wherein the holder is formed by bending a piece of sheet metal.

17. A print head comprising:
a transparent substrate;
a light emitting element coupled to the transparent substrate and configured to emit light in a first direction;
a lens positioned to receive light from the light emitting element, the transparent substrate extending between the light emitting element and the lens;
a holder including a body engaging the transparent substrate and a flange extending from the body and supporting the lens, the body and the flange being integrally formed; and
a biaser coupled to the holder and configured to urge the holder in the first direction, wherein
the holder includes a cylindrical flange that is positioned to limit movement of the biaser relative to the holder.

* * * * *